United States Patent [19]
Claes

[11] 3,926,654
[45] Dec. 16, 1975

[54] METHOD OF PREPARING A POLYPHASE SYSTEM

[75] Inventor: Frans Henri Claes, Edegem, Belgium

[73] Assignee: Agfa-Gevaert, Mortsel, Belgium

[22] Filed: Nov. 7, 1973

[21] Appl. No.: 413,458

Related U.S. Application Data

[62] Division of Ser. No. 129,664, March 31, 1971, Pat. No. 3,801,326.

[30] Foreign Application Priority Data

Apr. 3, 1970 United Kingdom............... 15948/70

[52] U.S. Cl......... 106/137; 260/29.6 PM; 260/34.2; 106/198; 96/114.7
[51] Int. Cl.²..................... G03C 1/02; C09H 11/00
[58] Field of Search..... 106/137, 198; 260/29.6 PM, 260/34.2, 13, 8; 252/314

[56] References Cited
UNITED STATES PATENTS

| | | | |
|---|---|---|---|
| 1,980,589 | 11/1934 | Acree.......................... | 260/29.6 PM |
| 2,925,412 | 2/1960 | Johnston........................ | 260/29.6 R |
| 3,356,629 | 12/1967 | Smith et al.................. | 260/29.6 PM |

*Primary Examiner*—Theodore Morris
*Attorney, Agent, or Firm*—William J. Daniel

[57] ABSTRACT

Liquids which form a poly-phase system when mixed are mixed together by the steps of continuously introducing the liquids at a substantially controlled rate into one end of a passageway defined by generally closely spaced surfaces of revolution, continuously removing the resultant admixture of liquids from the other end of said passageway at a rate to produce a continuous flow of the admixture through the passageway from the one end to the other end while maintaining the passageway filled with the admixture, and producing relative rotational movement between such surfaces whereby at least one of the surfaces moves substantially obliquely to the general direction of flow through the passageway, the velocity of such rotational movement being sufficient to induce a turbulent flow condition in substantially the entirety of the admixture within the passageway.

8 Claims, 29 Drawing Figures

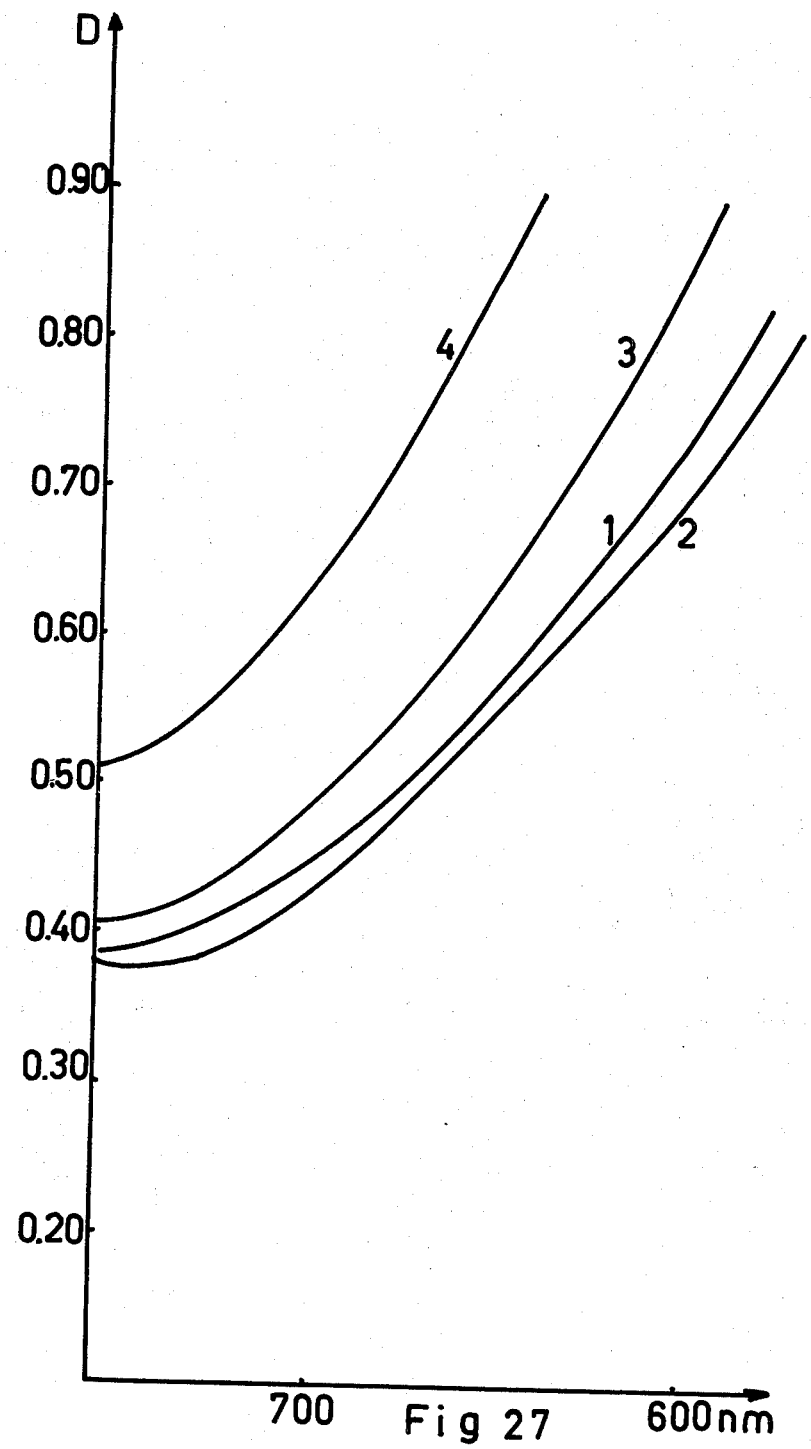

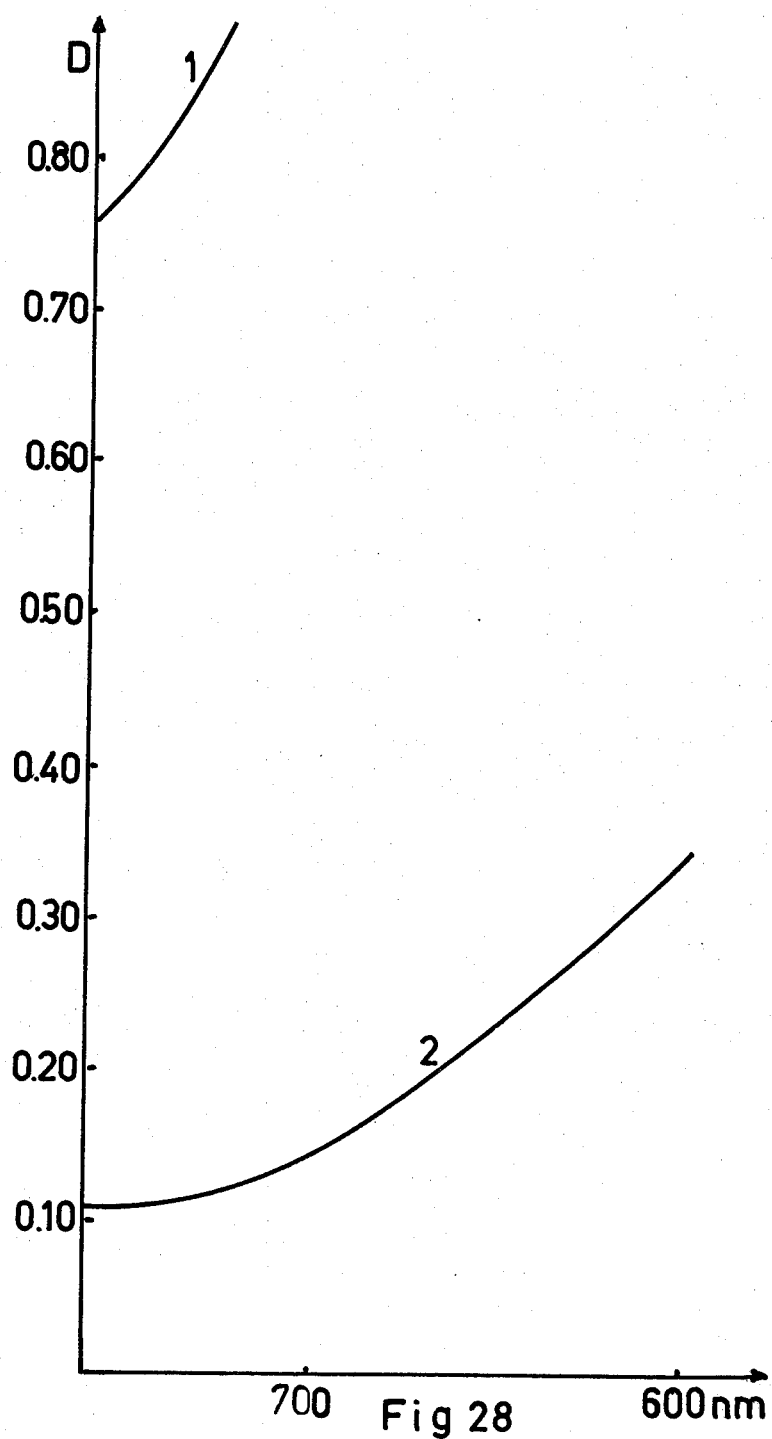

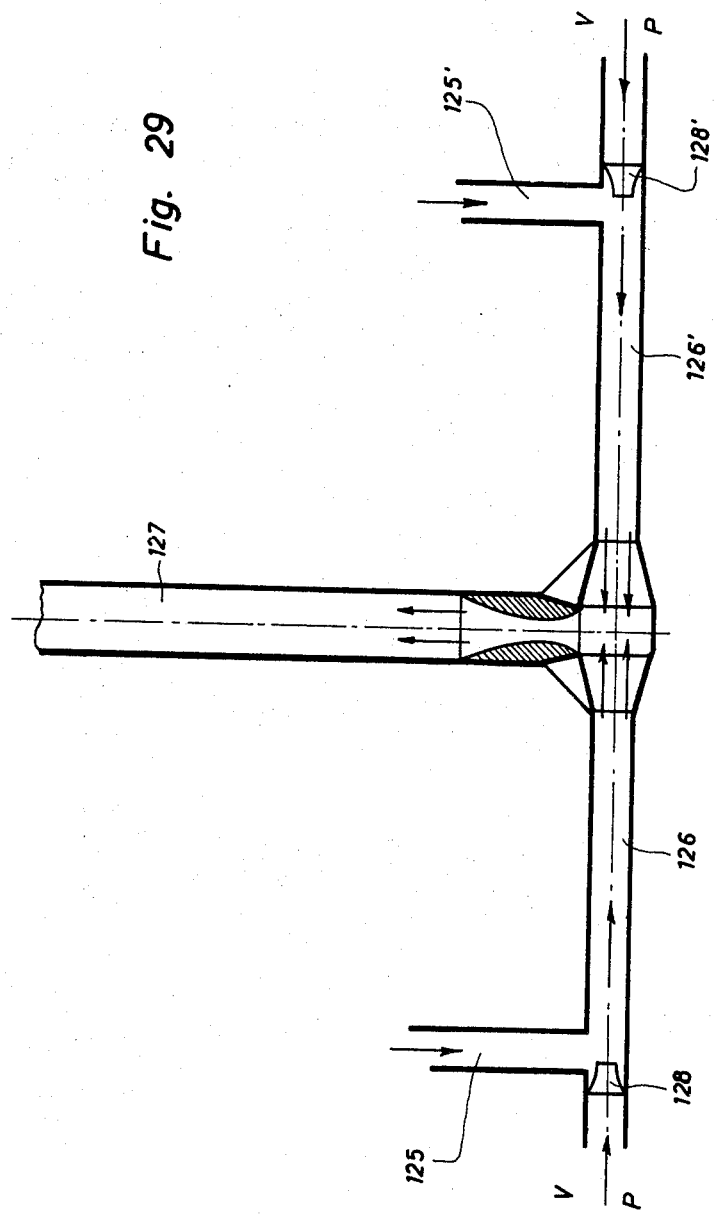

METHOD OF PREPARING A POLYPHASE SYSTEM

This is a division, of Ser. No. 129,664, filed Mar. 31, 1971, now U.S. Pat. No. 3,801,326.

This invention relates to a method of preparing dispersions by means of liquids that are mixed in a flow-through passage.

The invention has been made in the course of research relating to the preparation of light-sensitive silver halide dispersions but is also applicable in forming other dispersions, whether of one liquid in another (an emulsion) or of a solid in a liquid (a suspension).

Various methods have been proposed for intimately mixing liquid materials but for some purposes the known methods do not enable a sufficiently uniform mixture to be produced.

The present invention, broadly defined, resides in a method of mixing or more intimately mixing liquids, characterized in that the liquids to be mixed or more intimately mixed are continuously introduced into a passageway over the whole transverse cross-section of which the infed liquids are maintained in continuous flow away from the feed point or feed points and within which the liquid mass flowing through said passageway is subjected to forces creating turbulence throughout substantially its entire volume.

The method can for example be employed for the purpose of reducing the size of the dispersed droplets of an emulsion.

Another, and particularly important field of application of the invention, is the formation of dispersions, whether emulsions or suspensions, by mixing liquids constituted so that the mixing causes the formation of a disperse phase. This is the case when mixing a plurality of liquids that contain dissolved ingredient(s), which chemically or physically react and form a product that represents a disperse or discontinuous phase, in the mixed liquid mass. For example, one liquid may contain a dissolved substance that precipitates on modification of the pH of the liquid and the other liquid may contain an ingredient that brings about such pH modification. As another example, one liquid may contain a dissolved substance and the other a liquid that is miscible with the first liquid but is a non-solvent for such substances. Alternatively the different liquids may contain dissolved ingredients that can react to form a solid precipitate e.g. in the form of crystal grains. An example of such a process is the formation of silver halide grains by the reaction of a soluble silver salt and a soluble halide.

It is an important feature of the invention that the liquids constituting the starting material continuously flow away from the feed point or feed points, notwithstanding that shearing stresses are generated throughout the volume of the liquid. As a result of these conditions the quanta of liquids entering the passageway at any given time do not become mixed with material that already has been subjected to shearing forces in the passageway. This is of special importance in the formation of dispersions in which it is desirable to keep the dispersed droplets or particles within a limited size range, and particularly in the formation of suspensions characterised by a disperse phase of small grain size because the stated conditions help to prevent growth of the dispersed droplets or particles by contact thereof with reactants fed into the passageway subsequent to the formation of such droplets or particles.

For precipitate-forming chemical reactions the different liquids whose mixing causes the formation of the precipitate should be continuously and separately fed in the mixing passageway. It is preferable for the transverse cross-sectional dimensions of the mixing passageway and the degree of turbulence to be such that the quantities of the reactants entering the passageway at any moment are used up substantially entirely in nucleation and not to any substantial extent in producing grain growth. This means that only small liquid volumes are brought together at any moment in the mixing passageway. It appears from experiments conducted so far, that in general, in order to achieve this result, the mixing passageway should have a very small transverse cross-sectional dimension, allowing the flow-through of a liquid film having a thickness less than 5 mm.

As will be exemplified hereafter, the performance of precipitate-forming reactions by means of the invention generally leads to a grain size distribution showing a logarithmic evolution, which is in contrast to the bell-shaped distribution curve (Gauss curve) obtained when silver halide emulsions are formed by a conventional batch process.

At the present stage of development of the invention, importance is attached to embodiments in which the liquid is in state of turbulent flow within the mixing passageway.

An important fact relating to turbulent flow is that while the forces acting on the liquid create within the liquid stream random local currents that are responsible for a large increase in the resistance to movement of the liquid, the liquid has at every point an average forward velocity component, i.e., a velocity component in the direction in which the liquid advances along the passagway. The average forward velocity components at the different points within the stream afford a well defined and predictable velocity profile. Accordingly, by passing as a thin film in turbulent flow in the mixing passageway the material is subjected to a uniform and predictable mixing action, due to shearing stresses throughout or substantially throughout its volume. This is in marked contrast to the effect of creating mere turbulence within a body of liquid, e.g. by means of a propeller.

The transition from laminar to turbulent flow is defined by the number of Reynold; this is a critical value giving at the moment of transition the ratio of the energy (erg in the c.g.s. system) necessary for obtaining a velocity v (cm per sec) of the moving liquid mass to the energy used up in friction.

The Reynold's number (Re) is more particularly calculated as follows:

$$Re = \frac{1 \cdot v \cdot \mu}{\eta}$$

wherein:
  $1$ = length in cm of the diameter of the flow-through cross-section, e.g., the diameter of a tube,
  $v$ = flow-through velocity of the liquid mass in cm per sec.,
  $\mu$ = density of the liquid mass $$\left( \frac{\text{mass in gram}}{\text{cm}^3} \right),$$

$\eta$ = dynamic viscosity (dyne.sec.cm$^{-2}$).

The critical Re value at which turbulent flow starts has to be determined experimentally for each type of liquid and each type of passage.

For example, when water is introduced into the slit-like passage formed by two cylinders having a smooth surface, if the clearance $(c) = r_2 - r_1$ between the outermost cylinder and inner cylinder is relatively small compared with their respective radii $r_2$ and $r_1$, and the outermost cylinder rotates and the inner cylinder is stationary, the critical Reynold's number is 1900. If, however, the inner cylinder is rotated and the outer cylinder is stationary, turbulent flow occurs at a much lower tangential velocity. The conditions for the transition from laminar to turbulent flow in a similar system have been defined theoretically and confirmed in practical tests by G. I. Taylor, Phil.Trans. (A) 223 (1923) p. 317.

$$Re = U.c/v_k > 41.3 \sqrt{r/d}$$

wherein:

$U$ = critical tangential velocity of the inner cylinder,
$c$ = clearance between the cylinders $$v_k = \frac{\eta}{\mu} = \frac{\text{kinematic viscosity}}{\text{density}}$$

$r$ = mean value of the radii $r_1$ and $r_2$ of the inner and outer cylinder respectively.

The turbulence obtained throughout the volume of liquid maerial, which at any moment fills the mixing passageway, can be created by exerting on the liquid in the flow direction a pressure sufficient to keep the Reynold's number well above the critical value at which turbulent flow conditions occur and/or by moving a wall or walls of the passageway at a sufficient velocity or velocities to create the turbulent flow by friction. It is presently preferred for the mixing passageway to be defined by walls that are continuously relatively rotated about an axis for generating such frictional forces.

The mixing passageway may be in the form of a layer or film space and that form of passageway is preferred. The thickness of the layer or film space is preferably less than 5 mm at all points along the space, or at least along a part thereof extending from the feed point or feed points for the liquids. As hereafter exemplified the thickness of the layer space need not be uniform.

A said layer space may, e.g., be defined by two plates, e.g., discs, at least one of which is rotated relative to the other at high speed (e.g. at 10,000 – 20,000 r.p.m.). The layer space between the plates may, e.g., be of the order of 0.05 mm. The plates may, e.g., be discs having a diameter of 50 cm or less. Larger diameters are not excluded but tend to involve unnecessarily high centrifugal forces.

In the most preferred embodiments of the invention the mixing passageway is in the form of an annular layer space defined by facing surfaces of revolution and the liquid within that passageway is maintained in turbulent flow wholly or mainly by frictional forces generated by relative rotations of such surfaces about their common axis of revolution. The surfaces defining the passageway may be even, or one or each of them may be formed with a helical groove, but in order that liquid in the groove or grooves shall not be shielded from the tangential shearing forces the inclination of the or each groove to the axis of revolution should be in excess of 45°. Apparatus of this kind may, e.g., comprise a body, which is rotatable within a radially symmetrical space defined by a surrounding housing or casing and which defines therewith an annular layer space that can be kept filled with liquid material by feeding such material continuously into the annular space at one end and continuously discharging liquid at a corresponding rate from the other end of such space while the inner body is kept in rotation at a sufficient speed to keep the Reynold's number appartaining to the flow of liquid along such space above the critical value at which turbulent flow occurs. Of course, the necessary frictional forces for creating turbulence may be generated by rotating the housing relative to the inner body instead of vice versa or by rotating the inner body and the housing in opposite directions. The requisite forces for creating the turbulence may, if desired, be established in part by feeding the liquid material into the annular passage under pressure, in which case the relative rotational speed of the inner body and housing may be correspondingly reduced. In general, however, it is preferred to feed the liquid material into the annular space under gravity because the feed system can then be of particularly simple form. The inner and outer bodies can be cylindrical or one or both of them may be of a diameter that varies along the axial length of such body or bodies, preferably in such a manner that the annular space decreases in thickness towards the end thereof from which the mixed liquid materials discharge. Thus, the inner diameter of the housing may remain constant or decrease, while the external diameter of the inner body increases, or both said diameters may increase but at different rates, or the external diameter of the inner body may remain constant while the internal diameter of the housing decreases. Preferably, however, the internal profile of the housing and the external profile of the inner body taper towards the discharge end so that the annular space decreases towards the discharge end of the space. In all these embodiments the inner body may be located co-axially or excentrically with respect to the housing, but preferably the housing and inner body are radically symmetrical and co-axial.

The facing walls defining the layer space may be smooth or may have a roughness and/or protuberances, which contribute(s) to create the requisite turbulence. The turbulence can sometimes be promoted by designing or using the apparatus so that the liquid in the mixing passage is subjected to frictional forces, due to relative movement of the walls defining the layer space, which vary in magnitude and/or direction from one point to another along the liquid flow path. In the case of a disc type apparatus the tangential shearing forces increase towards the periphery of the layer space. In the case of an apparatus providing an annular space between inner and outer relatively rotating bodies, a change in circumferential velocity and tangential shearing forces may occur by diminishing the section of the annular space. More or less abrupt changes in angular velocity can also be brought about by varying the speed of relative rotation of the discs or other bodies defining the layer space. In addition or alternatively the direction of rotation of the or each body may be changed during the flow of any quantum of liquid material along the layer space between the bodies, and/or one or each body may be oscillated in a direction parallel with the inlet-to-outlet flow direction.

In the preparation of silver halide grains preferably a continuous flow mixing apparatus is used, which comprises a central inner body (rotor) and outer body (casing or housing) surrounding the mantle surface of the rotor and wherein the housing and rotor are arranged co-axially and form a clearance or layer space in the form of an annular passage having a section continuously decreasing perpendicular to the axis of revolution, said layer space serving at its larger section as the inlet for the mixing zone that is formed between the mantle of the rotor and the surrounding surface of the housing, and serving at its smaller section as the outlet for the mixing zone and wherein the facing walls defining the layer space are non-perforated, smooth or helicoidally grooved or have a roughness and/or dot-like protuberances, which contribute(s) to create turbulence in a liquid that is forced to pass through said clearance, the rotor and/or housing being provided with an actuating means for its or their rotational movement along said axis. In said apparatus the housing departing from the zone of larger sections preferably extends non-perpendicularly in line with the axis of revolution above the rotor, and the top surface of the rotor in the zone of the larger sections has preferably the form of a conus whose vertex is directed upwards and whose surface is smooth.

The invention is of special value for the preparation of light-sensitive silver halide emulsions and will hereafter be more particularly described in that context. Various other types of reactions involving the formation of dispersions and precipitates for which the invention can be employed with advantage will be exemplified later herein.

In silver halide emulsion preparation, in addition to promoting the formation of silver halide grains with a narrow grain size distribution, the invention has the important potential advantage that silver halide grains of extremely small average size can be formed.

The size of the silver halide grains formed in the silver halide emulsion depends on a number of different factors. These factors include the concentration of the solutions of the soluble salts which are made to react to form the silver halide precipitate, the pH and temperature of the reaction mixture, the amount of gelatin or other protective colloid present in that mixture, the presence or absence of crystallization nuclei and/or grain growth inhibitor or restrainer and the pAg value of the reaction medium in which the silver halide precipitation occurs, the latter value being dependent on the relative quantities of silver and halide ions in the reaction mixture. The way in which these factors individually influence the silver halide grain size is well known per se. Thus, e.g., it is well known that other factors being equal, the silver halide grains will be smaller as the pAg of the reaction medium, determined by the excess of silver over halide ions or vice versa, approaches a value at which the silver halide solubility is minimal, i.e., at a pAg value between 2.5–3.5 or between 7.5 and 8.5.

prior to this invention the smallest average silver halide grain size attainable in silver halide emulsion preparation is approximately 0.05 micron. These fine grained emulsions are the so-called Lipmann emulsions in the preparation of which use is made of grain growth inhibitors or restrainers. Such micrograin emulsions are of importance for the preparation of photographic plates or films to be used in high resolution work, e.g., microphotography, astrophotography, the recording of nucleo-physical phenomena, the preparation of masks in the production of micro-electronic integrated circuits, and for recording and reproducing halograms or radiation interference or diffraction patterns.

Provided the constitution of the reaction mixture and its temperature are selected to promote the formation of silver halide grains of minimum size, it is possible by mixing the reactants by a method according to the invention as hereinbefore defined, to form a silver halide emulsion containing silver halide with an average grain size well below 0.05 microns. The grain size tends to get smaller as the shearing forces to which the reaction mixture is subjected increase. It is easily possible to establish a turbulent flow in which the shear forces are such that the silver halide grains in the emulsion discharging from the mixing passageway have an average size less than 0.03 micron.

Reference will hereafter be made to the accompanying drawings in which:

FIGS. 22 and 28 are graphs representing experimental results referred to in Examples 4 to 9 herein.

FIG. 29 is a diagrammatic sectional elevation of another reactor for use in carrying out the invention.

Figures 1, 2:
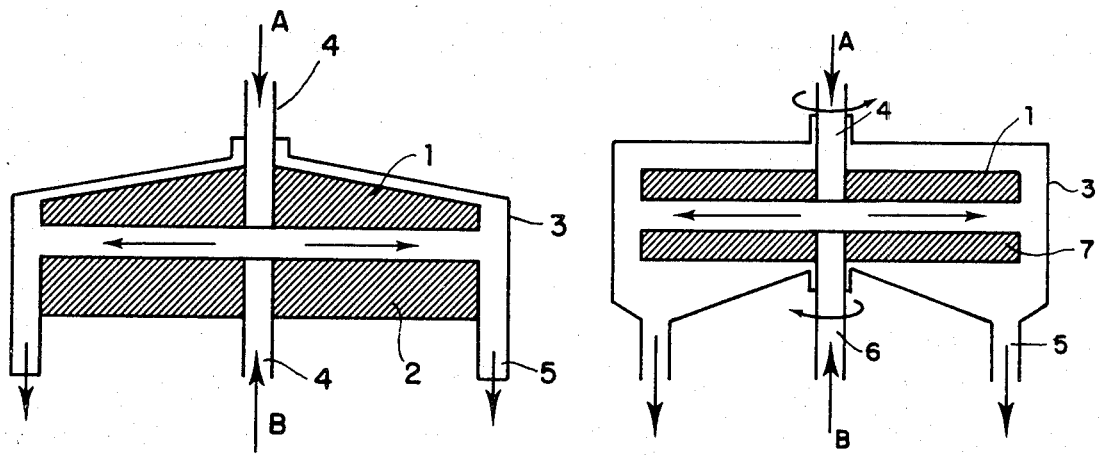
FIGS. 1 to 8 and 11 to 13 are diagrammatic cross-sectional views of continuous flow thin film reactors suitable for use according to the present invention.

In FIG. 1 an apparatus for continuous flow mixing in a circular slit-like passage is illustrated. The apparatus includes a disc 1 that is rotatably mounted parallel to a table 2, which is fixed in a housing 3. The shaft 4 of the disc 1 is hollow and serves to rotate the disc relative to the table 2 by means of a suitable actuating means, e.g., electrical motor (not shown) and serves simultaneously as a feed pipe for a liquid A containing the desired reactant for producing the solid particles, e.g., containing silver nitrate. In the centre of the table 2 there is another feed opening 4 through which a liquid B containing the necessary coreactant(s), e.g., a water-soluble halide is introduced. The obtained dispersion is evacuated through an annular outlet 5.

In FIG. 2 an apparatus is shown which is similar to the apparatus of FIG. 1, but wherein there are two discs rotating in opposite directions. Through the hollow shaft 4 of disc 1 a liquid A and through the hollow shaft 6 of disc 7 a liquid B are introduced respectively. The dispersion is evacuated through an outlet 5 in the housing 3.

Figure 3:
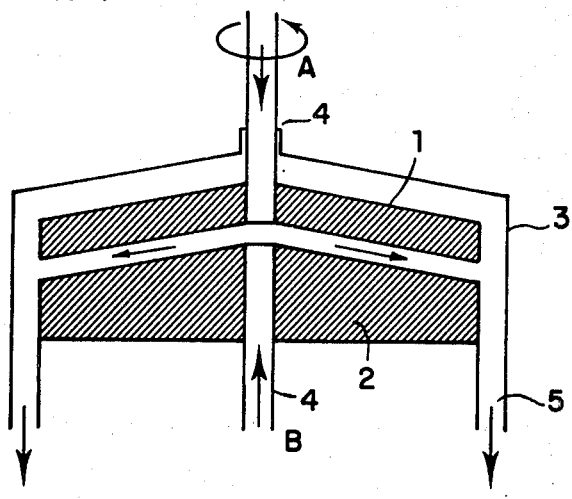

The apparatus shown in FIG. 3 is similar to that illustrated in FIG. 1 but the rotating disc 1 has a conical shape and forms with a stationary table 2 an annular passage whose transverse cross-section becomes smaller from the centre to the periphery of the rotating body.

Figure 4:
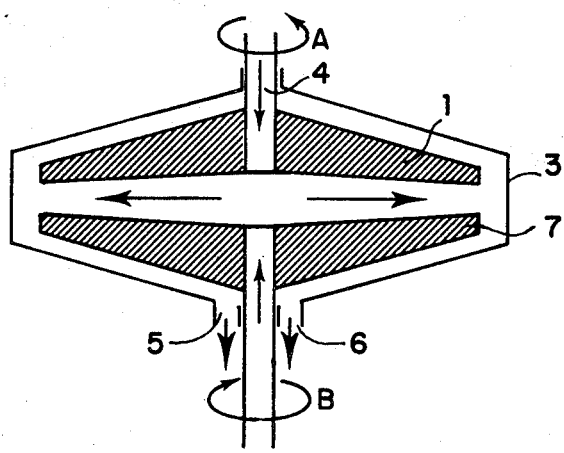

The apparatus shown in FIG. 4 is similar to that shown in FIG. 2 but the shape of the rotating discs is such that they have conical facing surfaces defining an annular passageway, which diminishes in thickness from the centre to the periphery.

Figure 5:
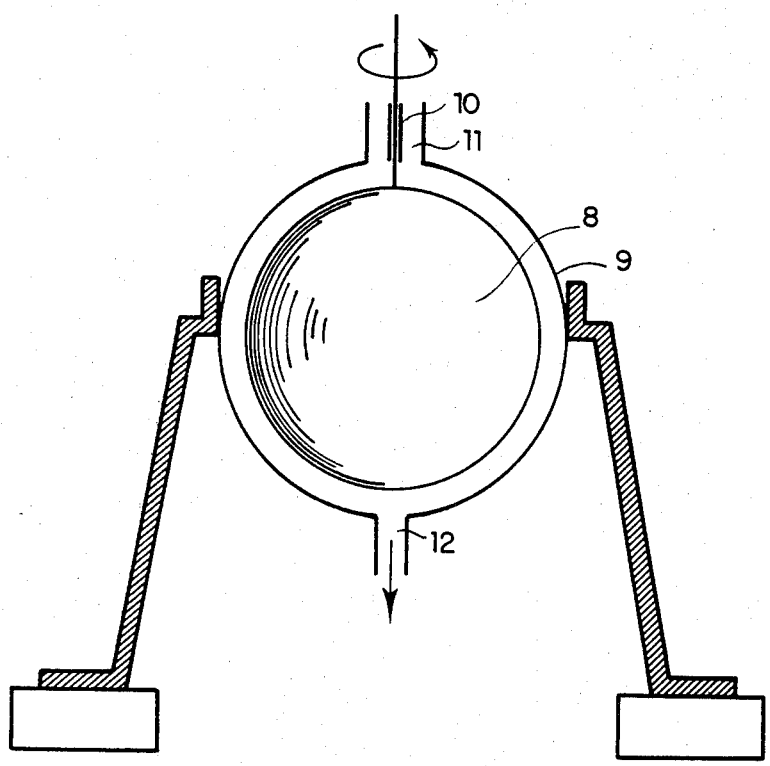

The apparatus shown in FIG. 5, incorporates a body in the form of a ball 8, which is rotatably mounted in a hollow sphere 9 having co-axial inlets 10 and 11 and a single outlet 12. The passageway between the body 8 and the sphere 9 is shown of constant thickness from top to bottom but the ball 8 may be mounted so that such passageway varies in thickness, e.g., so that it is larger near the inlets 10, 11 than near the outlet 12.

Figure 6:
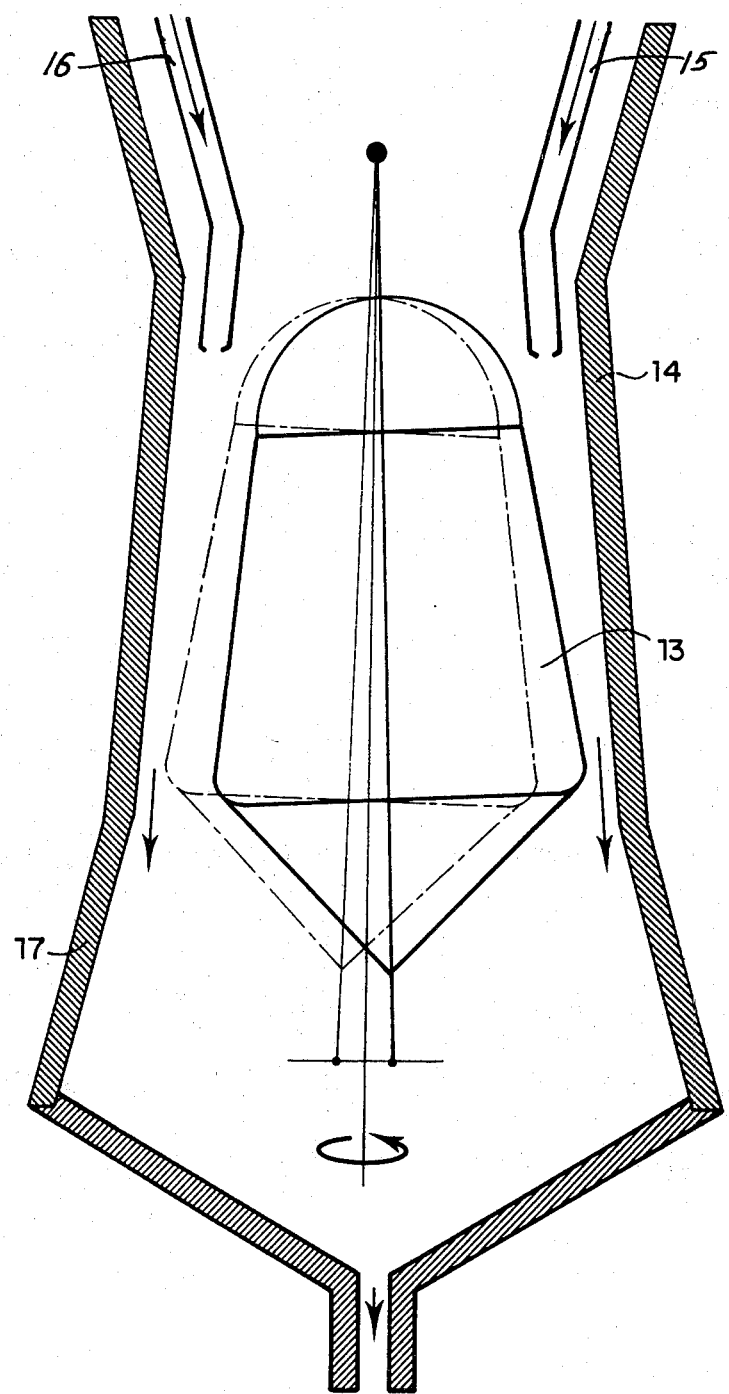

In the FIG. 6 apparatus a conical body 13 is mounted for oscillation (pendulum-wise) about an axis in a conical housing 14 the inner diameter of which increases from the top inlet of the mixing passageway to the bottom outlet thereof. The reagents are introduced through separate inlets 15 and 16 are evacuated through a single annular outlet 17.

Figure 7:
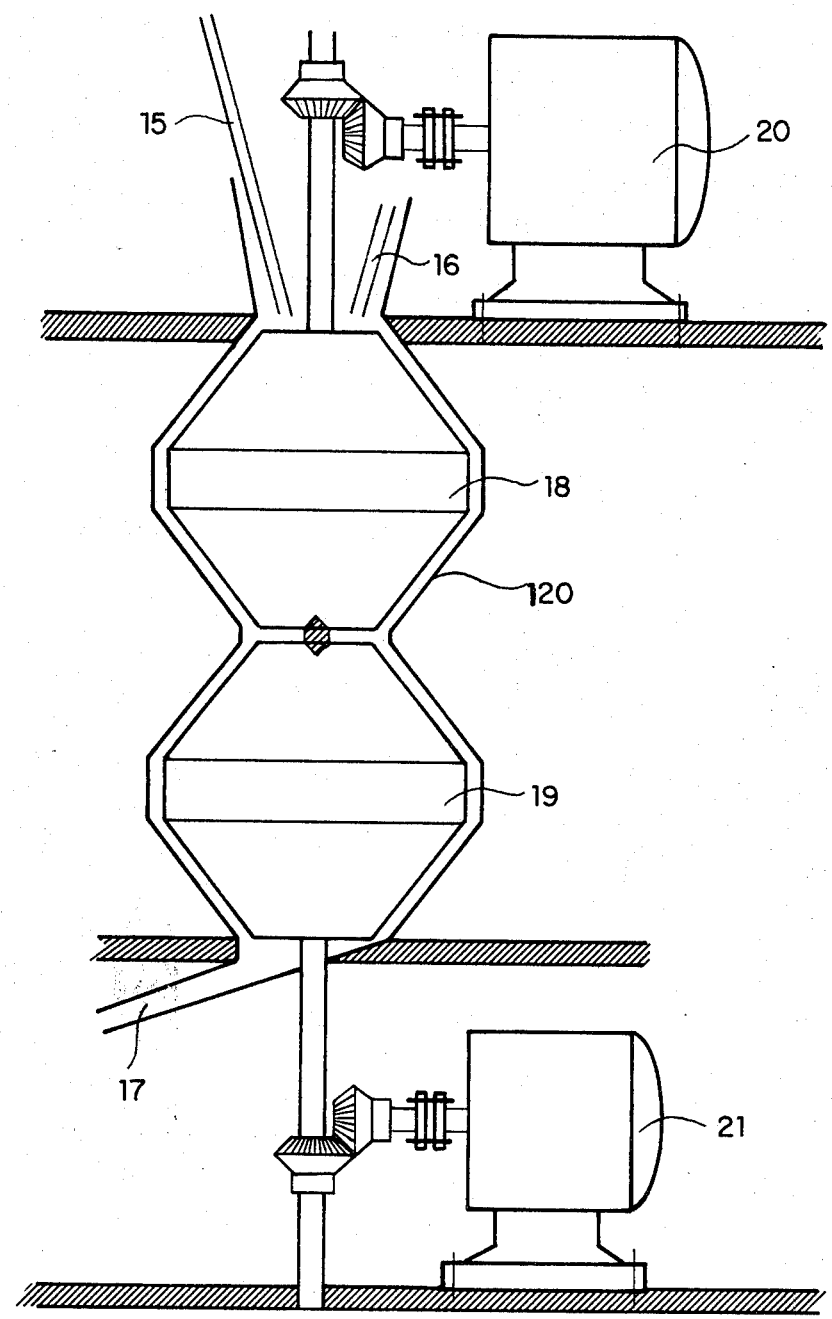

The FIG. 7 apparatus comprises two separately rotatable bodies 18 and 19, which are driven by electric motors 20 and 21 respectively. The speed of said motors is continuously variable and the bodies 18 and 19 can be rotated in the same or in opposite directions. This apparatus allows continuous changes in tangential and angular velocity. The reagents are introduced through separate inlets 15 and 16 at the top of a housing 120 and evacuated through a single outlet 17.

Instead of rotating the bodies 18 and 19 by separate electric motors the said bodies may be formed as the rotor of an electric motor and thus carry or incorporate the necessary armature components, e.g., conductors and/or magnetic poles. The housing 120 is then provided with a number of pairs of poles, which are spaced around its inner circumference, opposite to the poles or electrical armature of the rotor. The inner wall of the housing and the outer wall of the rotating body are preferably made of an insulating material or coated therewith, e.g., coated with polytetrafluoroethylene. The magnetic flux lines pass through the liquids to be mixed and may interact with charged particles or ions present in said liquids according to principles known from magnetohydrodynamics.

Figure 20:
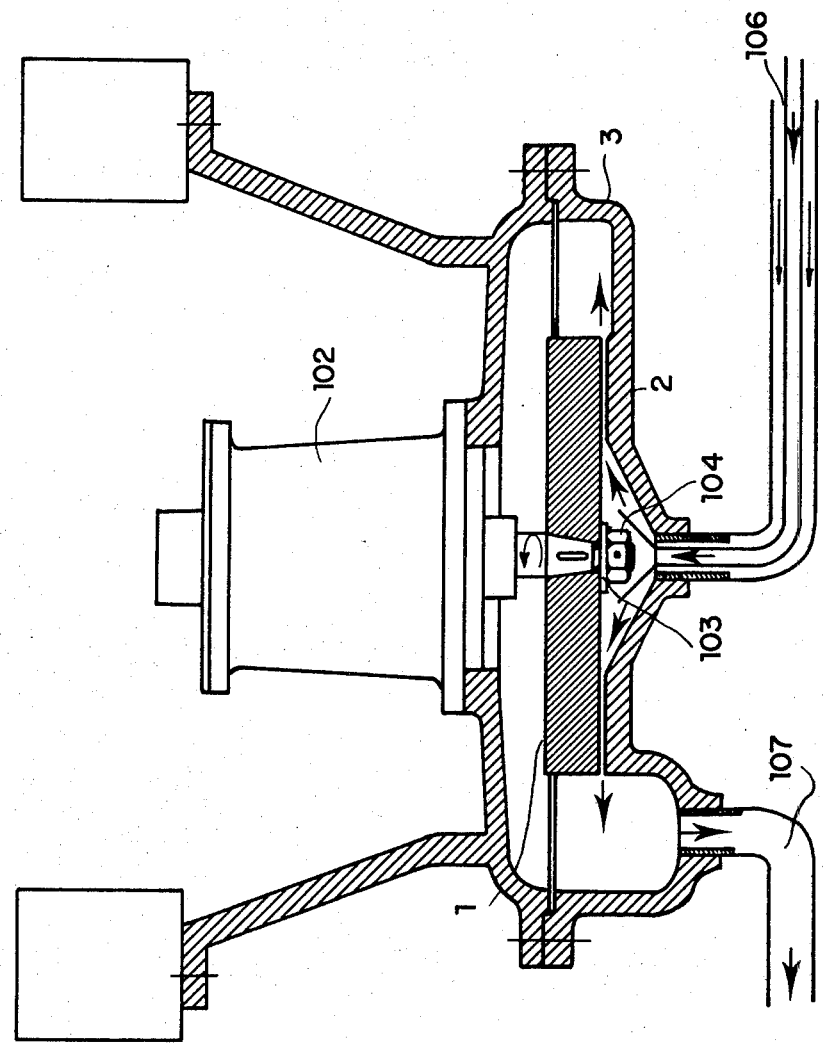
FIGS. 20 and 21 are cross-sectional elevations of mixing apparatus operating according to the principles described with reference to FIGS. 1 and 2 respectively.

The continuous flow film reactor represented in FIG. 20 incorporates a disc 1, which is rotatably mounted parallel to a table 2 that forms part of a housing 3. The disc is driven at high speed (up to 20,000 rpm) by means of an electric turbine-motor 102. The diameter of the disc is preferably not larger than 50 cm, so that the tangential speed at its circumference may be about 500 m/sec. The distance between disc 1 and table 2 is here variable by means of a calibrated plate (103) or plates arranged between a hexagonal nut 104 and the disc 1.

The liquids A and B are introduced through conduits 105 and 106 and through the centre of the table 2. The housing 3 is provided with a side discharge outlet 107.

Figure 21:
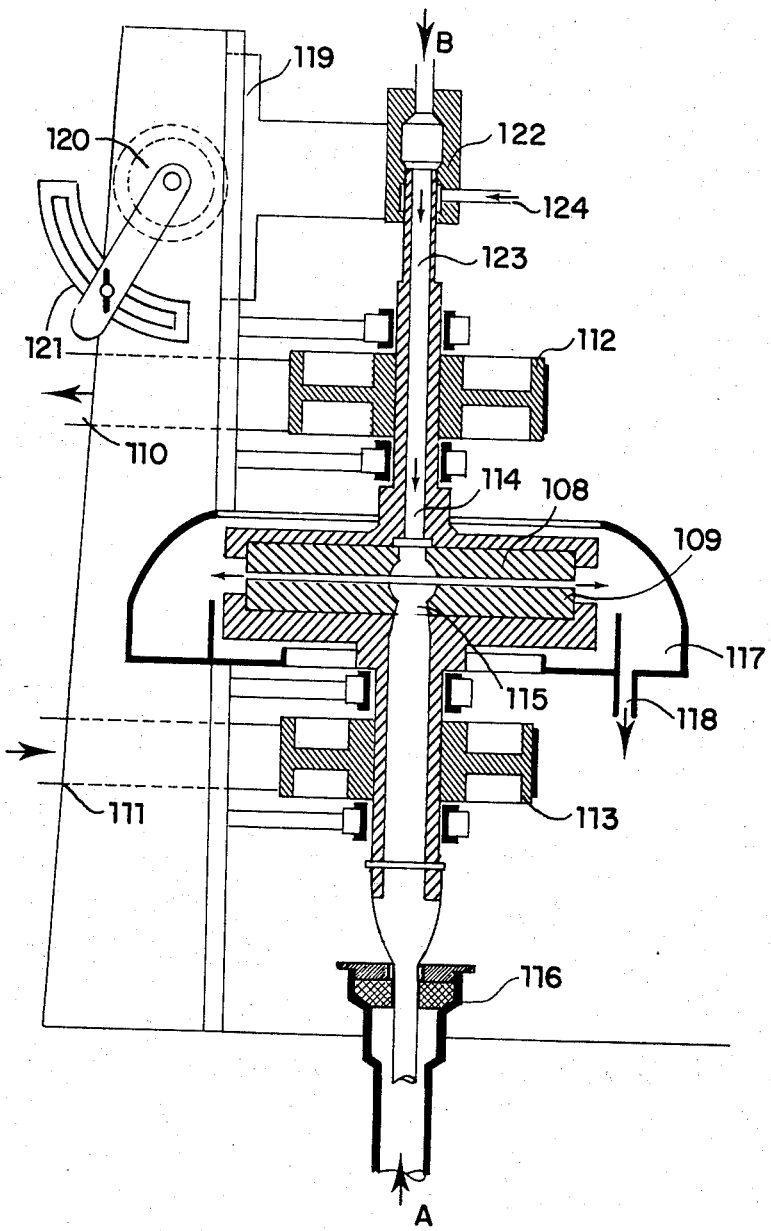

The continuous flow film reactor represented in FIG. 21 contains two discs 108 and 109 which are driven in opposite directions by means of driving belts 110 and 111 on pulleys 112 and 113 respectively. The liquids A and B used for forming the dispersion are fed in through conduits 114 and 115 and through the centre of the discs. The feed conduits are provided with the necessary packing means 116 allowing rotation of the conduits without leakage. The housing 117 is provided with a discharge outlet 118. The disc 108 is adjustable by means of a toothed rack 119 and pinion 120, which can be locked in any adjusted position by locking means 121. The bearing 122 for the hollow shaft 123 is lubricated by means of oil under pressure entering the pressure bearing through a conduit 124.

FIG. 29 shows a further continuous flow reactor or mixing device for mixing liquids according to the invention. This device consists of stationary parts and the turbulence in the mixing passageway is created by forcing the liquids through the device under sufficient pressure.

The device comprises inlet tubes 125, 125' leading into aligned tubes 126,126', which communicate with central mixing tube 127. The tubes 126,126' are fitted with nozzles 128,128'.

According to one embodiment of the invention, two substances to be reacted are fed through the tubes 125,125' while a carrier liquid is continuously forced through tubes 126,126', through nozzles 128,128', such carrier liquid serving as diluent. The carrier liquid is supplied under a controlled pressure (p) and at a velocity (V). The tubes 126,126' terminate at the junction with mixing tube 127 in a kind or rocket propulsion nozzle.

The liquids containing the reactants become intimately mixed in the tube 127 due to the high velocity and the turbulence created by frictional contact with the tube walls and by collision of the oppositely directed liquid streams.

According to a second embodiment a gas is fed through the nozzles 128,128' and different liquids are fed through the feed tubes 125,125' respectively. A kind of foam forms in the tubes 126,126'. A foam mass contains a frame or web of liquid film material. In mixing tube 127 an intimate mixing of the foam masses takes place in turbulent movement conditions.

More than two feed lines such as 126,126' may be used for the mixing of more than two liquids. For example, it is possible to arrange a number of tubes such as 126,126' as spokes of a wheel connected to a central mixing tube such as 127.

Instead of the tubes 126,126' being diametrically opposed, they may be connected tangentially to a thin film mixing chamber provided with a mixing tube such as 127.

Figure 8:
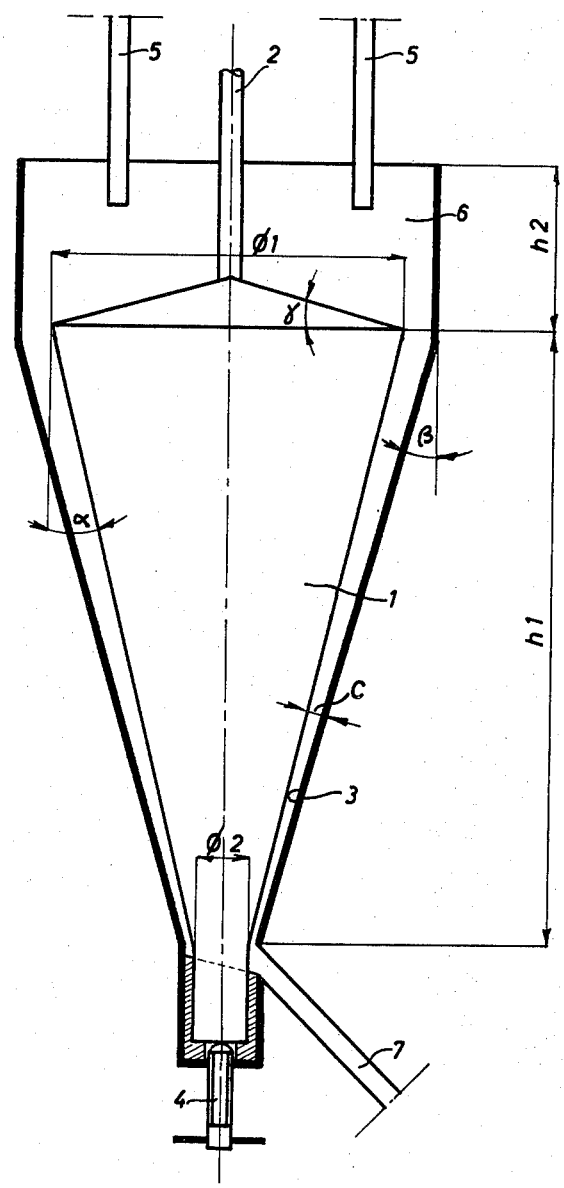

The mixing apparatus shown in FIG. 8 comprises a conical body 1 (rotor) rotatably driven by means of a shaft 2 connected to a suitable source of power such as an electric motor. The rotor 1 rotates in a conical chamber 3. The clearance designated (c) between rotor 1 and chamber 3 is variable by means of a regulating means comprising a threaded bolt 4. The ingredients for forming a dispersion, e.g., by chemical reaction, emulsification, saltingout or crystallization, are introduced through separate feed inlets, pipes or fittings 5, into the hopper 6 constituted by the upper portion of the apparatus. The formed mixture or reaction products are drained off through a pipe 7.

The upper portion of the chamber 3 can be left open as shown, or it may be closed, optionally light-tightly, according to the necessities of the operation to be carried out.

The angles $\alpha$ and $\beta$ as indicated in FIG. 8 need not necessarily be the same. The angle $\gamma$ may vary, e.g., between 0° and 90°. The part of the rotatable body located within the hopper 6 need not necessarily have a conical shape.

The diameters $\phi_1$ and $\phi_2$ and the heights $(h_1)$ and $(h_2)$ are chosen according to the required mixing time and mixing degree of intensity. Laboratory scale models may have, e.g., rotors with a height of 20 cm and a diameter $\phi_1$ of 10 cm. Large scale mixing apparatus for the mixing of rather large amounts of ingredients may have a rotor with a height of about 100 cm and a diameter $\phi_1$ of about 50 cm.

The diameter $\phi_2$ of the rotor at the drain off opening may be very small provided that the mechanical strength of the lower part of the rotor is sufficient and a proper balancing of the rotor is still possible.

The mixing apparatus according to FIG. 8 is normally operated in a vertical position so that gravity assists the flow of the liquid material to the outlet of the annular mixing passageway. However, the apparatus can be used in an inclined or even a horizontal position. In the latter case the rotor or rotating chamber preferably has a helical profile on its surfaces for conveying the mixture to the outlet.

When the apparatus is considered, e.g., in vertical operation, the ingredients to be mixed in liquid phase are continuously fed at a controlled rate through the feed inlets 5 and continuously discharge into the annular mixing passageway between rotor 1 and chamber 3. The liquid materials flow downwardly along a helical path within the said annular mixing passageway under the combined action of gravity and the frictional forces on the liquid due to the high speed rotation of the rotor 1. While in the passageway the liquid materials become thoroughly mixed by reason of the shearing forces, which are generated throughout substantially the entire volume of the liquid in the passageway, the whole of such liquid being in turbulent flow, only very small quantities of liquids come into contact at any moment in the inlet end of the mixing passageway. Such quantities are constrained always to move away from that inlet end towards the discharged end. Consequently, the reactants in those small quantities of liquids are substantially entirely used up in nucleation and not or not to any material extent in bringing about grain growth. The importance of the features referred to is apparent from the fact that if the reactants are fed at such a rate that they flow over and come into contact above the rotor rather than within the annular passageway, the result is an increase in the average grain size of the silver halide in the formed emulsion. It is to be understood that when a rotor is used having no helical liquid-conveying profile, the rotation speed and the clearance between the rotor and the chamber have to be such that an effective friction and turbulent flow of the ingredients still take place. That is why, in accordance with a preferred feature, the section of the annular passage between the chamber 3 and the rotor is made variable by the provision of the adjustment means 4.

Referring to FIG. 8 it is self-explanatory that the rotor and the inner wall of the housing need not be conical and may possess the shape of any other geometrical body of revolution having a decreasing diameter. The rotor body may, e.g., be shaped according to a curve forming part of a parabola, hyperbola or ellipse. In such cases the diameter of the rotor may still decrease from diameter $\phi_1$ to diameter $\phi_2$.

According to another embodiment, a rotor is used, which is of generally conical form but has a helical peripheral groove of constant or varying pitch. The crests and grooves may, e.g., be of conical, square, sinusoidal, semi-circular or any other required shape.

Figure 9:
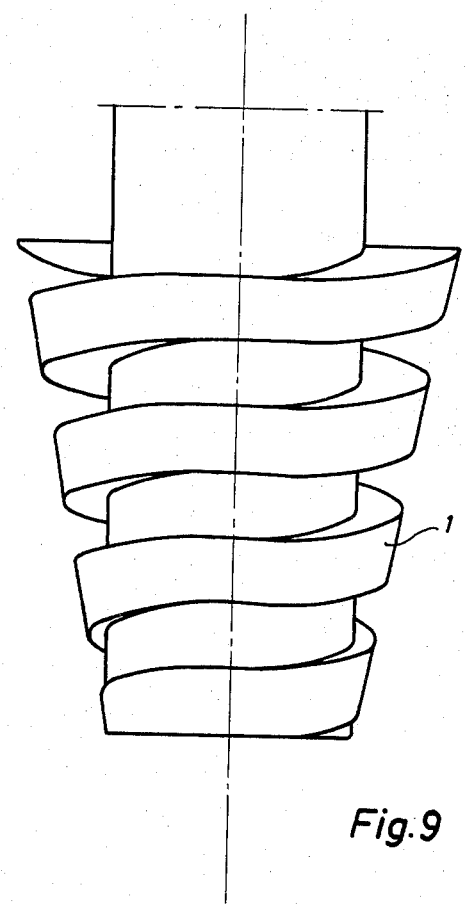
FIGS. 9 and 10 show different types of rotors for the apparatus shown in FIG. 8.
Figure 10:
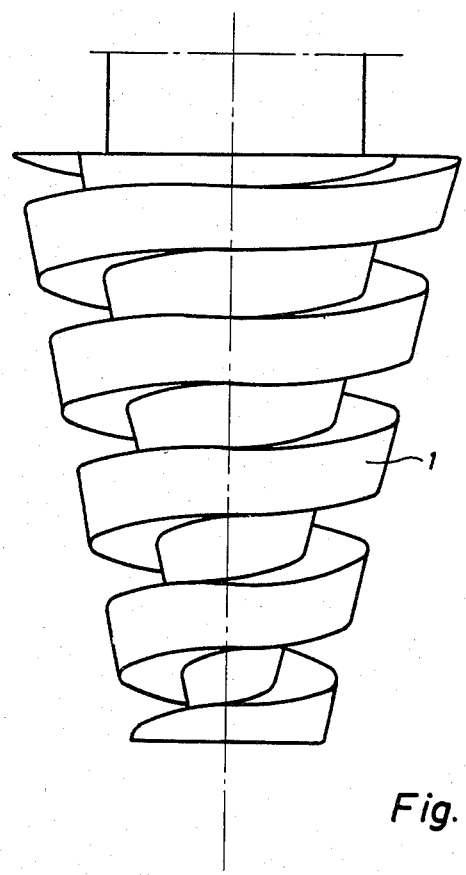

Two different forms of helically profiled rotors, which can be used in a housing as illustrated in FIG. 8, are shown in FIGS. 9 and 10. In the case of the rotor 1 shown in FIG. 9, the rotor is formed with a helical groove whose depth progressively diminishes towards the discharge end of the rotor whereas the diameter of the rotor, measured at the bottom of the groove remains constant. The rotor 1 shown in FIG. 10 is of generally conical form and tapers towards the discharge end both along the crest of the thread and along the bottom of the thread groove. The angles of taper along the crests and along the bottom of the thread groove may be the same or different so that the depth of the helical groove remains constant or gradually varies as the case may be.

Instead of causing displacement of the liquids by rotating a rotor within a stationary chamber or housing, it is possible to make the liquids follow a helical course by rotating only the chamber or by rotating the chamber and the rotor in the same direction at different angular speeds or in opposite directions. For simplicity in construction and efficiency in mixing, it is preferable to use a device with a rotatable inner body and a stationary housing.

Figure 11:
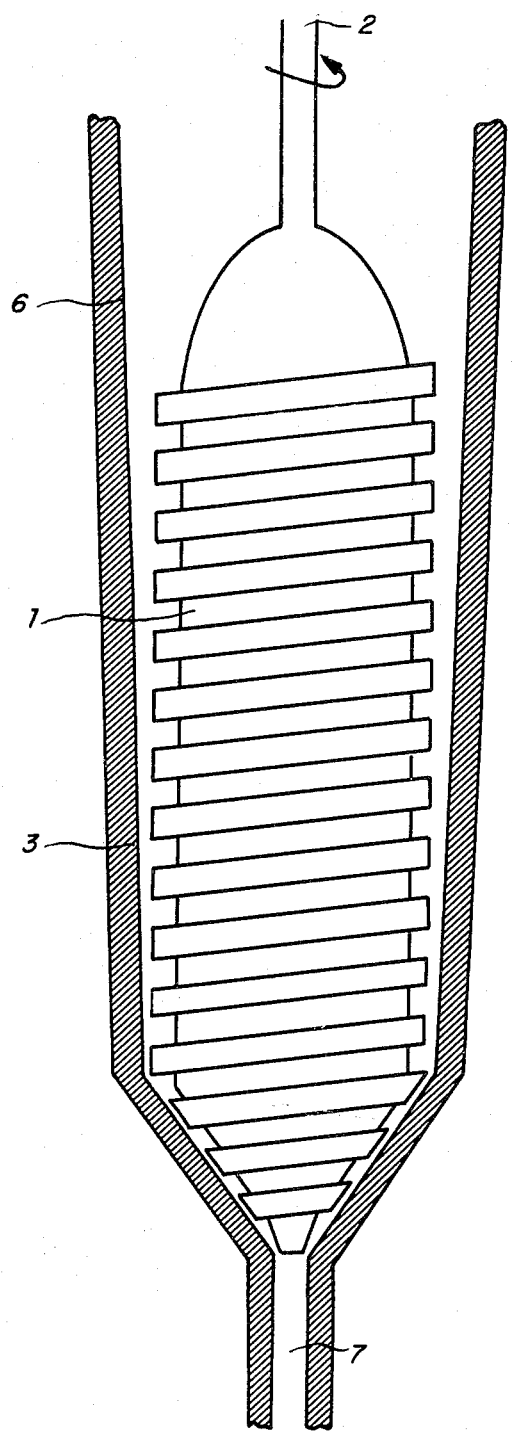
Figure 12:
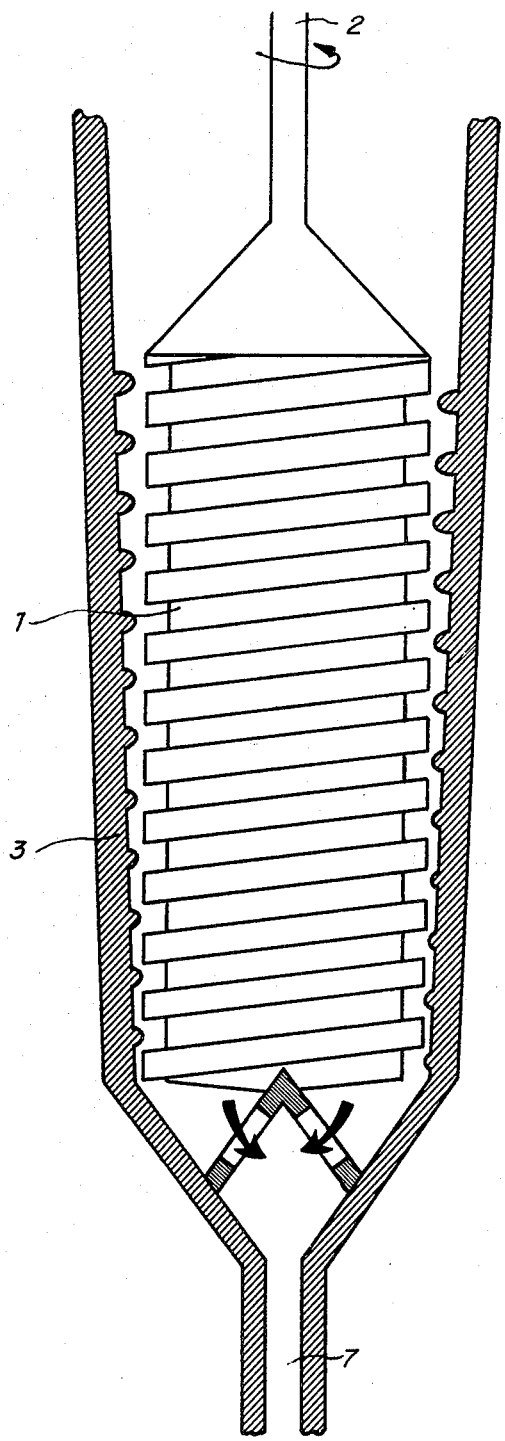
Figure 13:
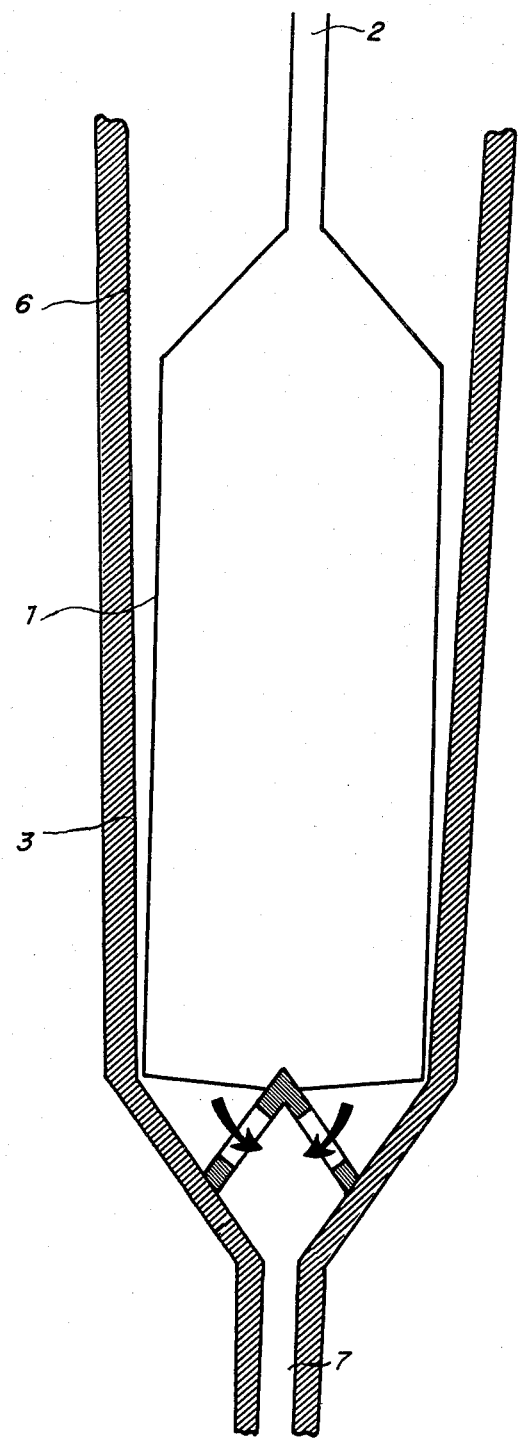

Further apparatus for use in carrying out the invention are shown in FIGS. 11, 12 and 13. The elements indicated by the numbers 1, 2, 3, 6 and 7 have the same function as those denoted by those numerals in FIG. 8.

Figure 14:
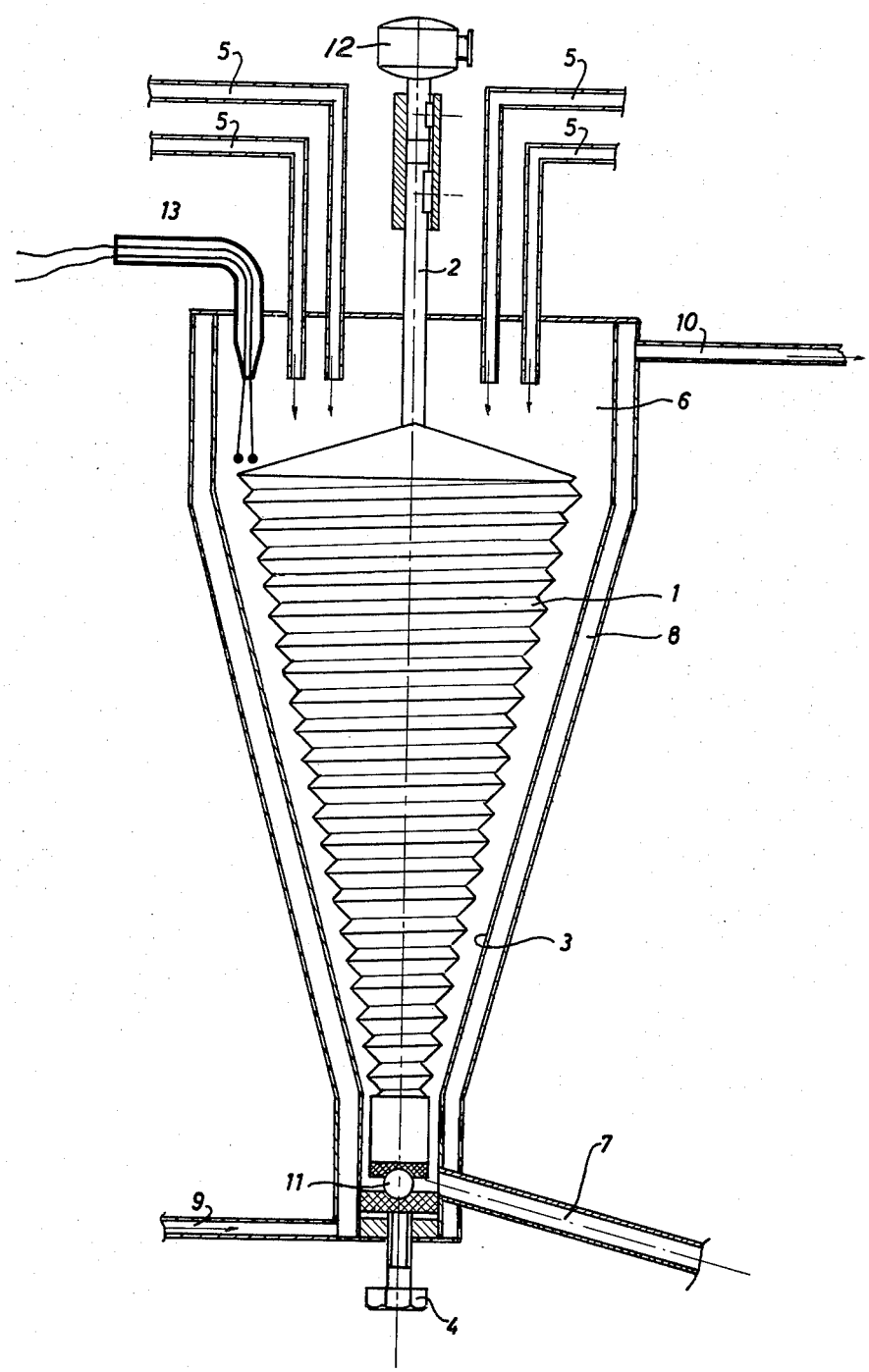
FIG. 14 is a cross-sectional elevation of a continuous flow film reactor of a type similar to the one shown in FIG. 8.

In FIG. 14 a more detailed view is given of a laboratory mixing device suitable for use according to the present invention, and especially in the continuous preparation of photographic silver halide emulsions. The rotor 21 is of the threaded conical type. The chamber 3 surrounding the rotor is provided with a heating or cooling jacket 8 having an inlet 9 and outlet 10 for a heating liquid, steam or a coolant, according to the purpose in view. As an alternative an electric heating means may be employed.

The clearance between chamber 3 and rotor 1 is variable by means of a centrally located threaded bolt 4 supporting a ball 11 reducing the friction of the rotor. The rotor 1 is driven by means of an electric motor 12, which is connected to a shaft 2 allowing for vertical adjustment of the rotor 1. The mixing has a bottom outlet 7 and one or a plurality of inlet pipes 5 for the introduction of the ingredients to be mixed. The upper part 6 of the chamber is provided with a sensing device 13, which may be of a pneumatic or electric type. For example the sensing device comprises an electrically insulating tube containing two electrically conductive needles, which make electric contact with the liquid materials in the mixing device when they attain a predetermined level. The resulting electric signal (control signal) is transmitted to the speed controller of gear pumps or other dosing means regulating the feed of the ingredients and/or is transmitted to the speed controller of the helically grooved rotor 1 to increase the rotor speed, so that the flow-through rate of the liquid materials is adjusted and the liquid does not rise above the said predetermined level.

The clearance between chamber 3 and rotor 1 is normally kept constant for one and the same mixing operation and can be adjusted taking into account factors such as viscosity, mixing effectiveness, reaction rate, heat transfer and volumes to be mixed in a certain period. The mixing effectiveness increases in inverse proportion to the clearance so that preference is given to so-called "thin-film" mixing wherein the mixing device operates with a clearance between the outermost surface parts of the rotor and the chamber wall of preferably about 2 mm in laboratory scale models (rotor height 20 cm) and of not more than 10 mm in large scale industrial models (rotor height 100 cm). The clearance is preferably variable between 0.01 and 10 mm.

Figure 15:
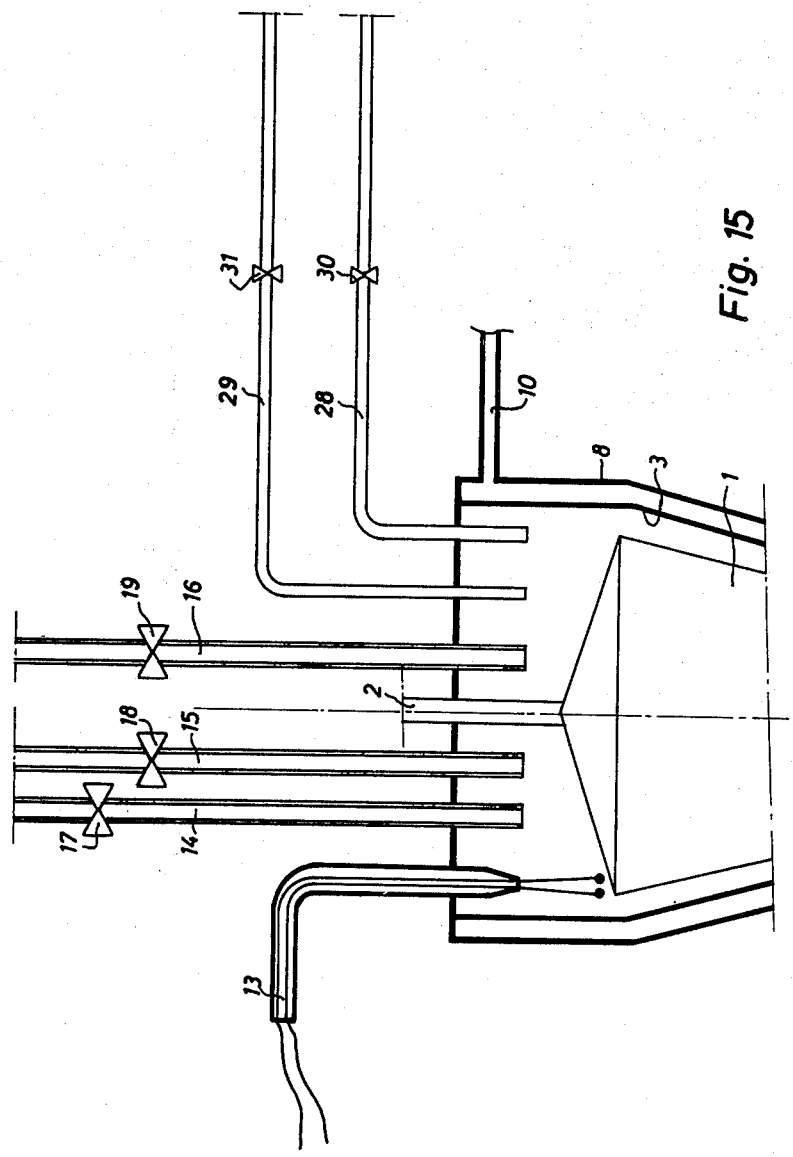
FIG. 15 shows a particular form of inlet system for use in the emulsification (precipitation) step in the preparation of a photographic silver halide emulsion when using mixing apparatus as shown in FIG. 14.
Figure 16:
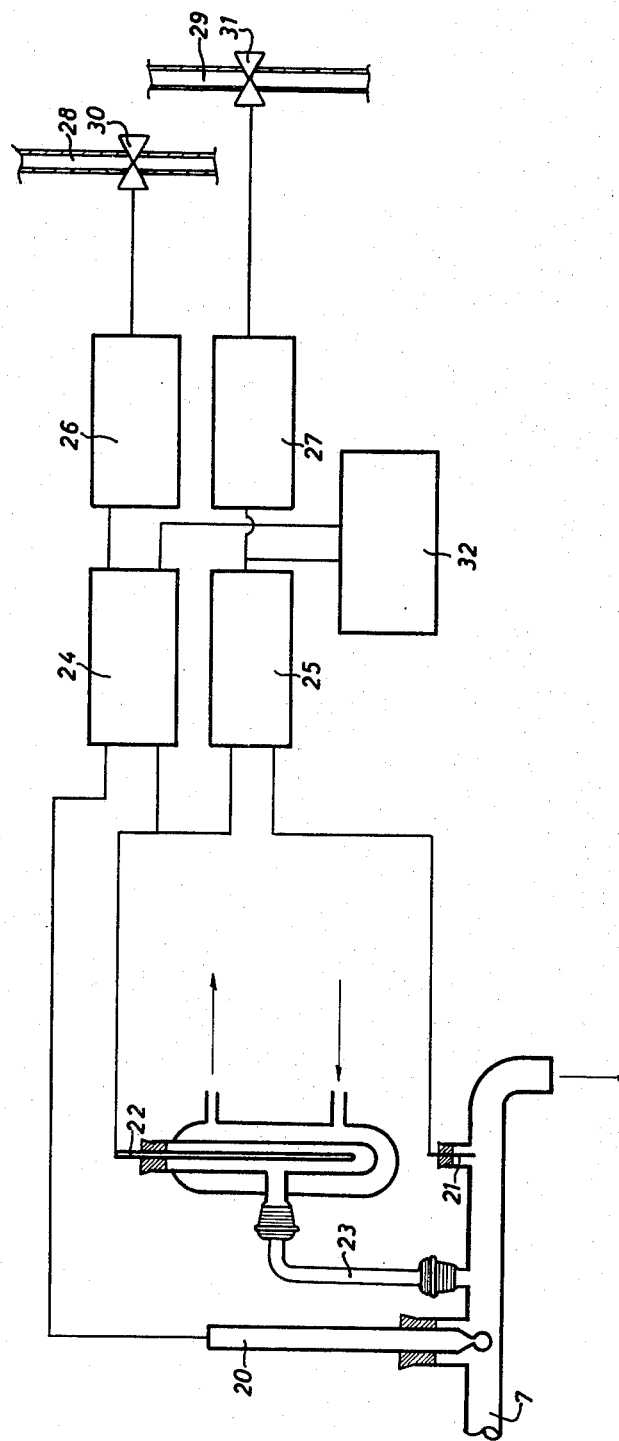
FIG. 16 is a block diagram representing an electronic measurement and control system for regulating the intake of photographic silver halide emulsion ingredients.

In order to illustrate the continuous precipitation of silver halide in the preparation of photographic silver halide emulsions according to the present invention reference is particularly made to FIGS. 15 and 16.

In FIG. 15 a particular inlet system for silver halide precipitation is represented, which system has to be considered as a modification of the inlet system represented in FIG. 14.

According to FIG. 15 the inlet system contains three separate feed conduits 14, 15 and 16 provided with magnetic valves 17, 18 and 19 respectively. Apart from the inlet system the mixing apparatus is the same as that represented in FIG. 14 including a chamber jacket 8 for a heating or cooling gas or liquid, preferably steam or water. The dispersion formed in the mixing device discharges through the conduit 7 (FIG. 14), which as indicated in FIG. 16 is provided with a thermometer and electrodes. The mixing apparatus is supported for operation in a vertical position by means of a supporting frame or mounting brackets (not shown).

An aqueous silver nitrate solution and an aqueous solution of gelatin and water-soluble halide, e.g., potassium bromide and sodium chloride are fed separately at a controlled rate through the conduits 14 and 15 respectively.

The conduit 16 is optionally used to introduce special ingredients or pH-regulating compounds into the emulsification mixture. For example, such conduit may be used to introduce special ingredients or pH-regulating compounds into the emulsification mixture. For example, such conduit may be used to introduce an aqueous solution of ammonia or acetic acid and other substances that influence pH and grain growth.

The temperature of the reaction mass can be varied over wide limits according to the result aimed at, but is normally kept below 80°C in the silver halide precipitation stage.

Gravity and/or pressure, e.g., air pressure, the speed of the rotor, the profile of the rotor and of the inner chamber wall, and the clearance between rotor and chamber wall, determine the time of passage through the mixing device.

Since the flow of the liquid mass in the annular passageway around the rotor is highly turbulent a rapid contact between the reactants, which are present in a thin liquid film and not in a bulky mass in a batch process, is ensured. Only very small quantities of reactants are allowed to come into contact at each moment. The products obtained discharge continuously and rapidly from the mixing device.

The silver halide formation is a fast chemical reaction and it proceeds continuously in the mixing device so that in a fairly short time large quantities of silver halide grains of reproducible quality are obtained.

The reactants are intimately mixed under conditions that permit excellent temperature control without the necessity of using a considerable excess of one of the reactants. The contact of small amount of reactants in short contact time (e.g., from a split second to a few seconds) and the fast evacuation of the reaction products from the turbulent flow thin film mixing device make it possible to produce silver halide emulsions with a narrow grain size distribution and very small grain size, e.g., a grain size below 100 nm and even below 30 nm.

In order to obtain highly reproducible results the silver halide precipitation can be electronically controlled and regulated by signals obtained in continuous measurement, as will be described with reference to FIG. 16. The discharge pipe 7 of the thin film reactor is provided with a glass electrode 20 (pH-control), a silver electrode 21 (pAg control) and a common thermostabilized reference calomel electrode 22. The latter electrode is connected to the emulsion flow by means of a saturated potassium nitrate bridge 23 containing the potassium nitrate, e.g., absorbed in agar-agar.

The potential difference between glass electrode 20 and calomel electrode 22 is fed to an electronic potentiometer 24 calibrated in pH-readings. The potential difference obtained between the silver electrode 21 and calomel electrode 22 is fed to an electronic potentiometer 25 yielding millivolt readings from which the pAg can be computed. The amounts of substance such as acetic acid and water-soluble halide for connecting the pH and pAg are controlled by magnetic valves 30 and 31, which are connected to two process controllers 26 and 27 respectively, adjusted to maintain a given pH and pAg value respectively. The output of the potentiometers 24 and 25 is fed to said process controllers 26 and 27 and the difference signal is used to control the magnetic valves 30 and 31. The electronic signals corresponding with the pH and pAg measurements are further fed to a recording galvanometer 32 so that a continuous diagram of the evolution of pH and pAg during precipitation is obtained.

The temperature, which has to be kept constant for obtaining reproducible results, can be measured at the outlet with a resistance thermometer and the output signal compared with a preset control signal in a differential potential transmitter. When the desired temperature conditions prevail, the difference between the two signals is zero. The difference signal is used, e.g., to control a needle valve on a steam supply inlet on the heating jacket of the conical mixing device or to control the speed of a motor connected to a gear pump, which pumps a liquid coolant into the jacket. The outlet of the mixing apparatus may be additionally fitted with means for measuring the turbidity, the spectral absorption and/or the conductivity of the passing liquid.

The method according to the present invention can be applied to the preparation of all types of photographic emulsions, e.g., neutral, acid and ammonia type emulsions and according to a preset programme adapted to different modes of emulsification. The manner of addition of the ingredients, the emulsification time, the emulsification temperature and the excess of halide present, either in uniform or decreasing amount, can be easily modified or varied. In considering emulsion formulae, the usual way of defining the quantity of halide is as the percentage excess over the quantity equivalent to silver. Iodobromide emulsions usually contain between 20 % and 250 % excess bromide during precipitation and ripening. Chlorobromide and chloride emulsions rarely contain more than about 10 % excess halide and the excess may be as low as 1 % to 2 % in cases wherein very little grain growth is desired.

The quantity of ammonia, if any is used, may be introduced into the silver nitrate solution, where its addition initially precipitates silver oxide, which on further ammonia addition dissolves to give a solution of complex amine. Alternatively, the ammonia may be incorporated in the halide/geltain solution.

The pH of the precipitation mixture in case an ammoniacal emulsion is prepared, to a large extent is controlled by the ammonia addition, but in other emulsions the pH during precipitation may be critical and has therefore to be kept carefully under control, notably with a view to the preparation of small silver halide grains.

The proportion of the different halides in the silver halide crystal and their sequence of introduction can be easily controlled and, e.g., spread over two or more mixing devices arranged in series. So, it is easy to obtain types of composite grain emulsions, e.g., as described in the United Kingdom patent specification 1,027,146. According to the last mentioned process, a fine grain emulsion with narrow grain size distribution is first prepared. After interruption of precipitation, chemical ripening is performed and precipitation is then continued. An emulsion comprising silver halide grains that consists of a chemically ripened core covered by an unripened layer of silver halide is obtained.

The turbulent flow mixing in a thin layer according to the invention, is likewise suitable for the preparation of silver halide emulsions wherein a part of all of the silver halide of the initially formed silver halide grains is replaced (converted or substituted) by another type of silver halide, e.g., a silver chloride part is replaced by a bromide part, without changing the grain size. Such a type of silver halide emulsion is called "converted emulsion".

The cations of the halide use in the emulsion preparation are commonly potassium or ammonium but cations of alkaline earth metal salts such as calcium chloride, or other soluble metal halides may be used. The latter may be introduced in either large or small quantities for special effects, e.g., cadmium ions are used for retarding the ripening of silver halide and to prepare contrasty silver chloride and silver chlorobromide emulsions.

In order to restrain the grain growth deliberately, different measures can be taken. Thus, it is known that the silver halide grains formed during precipitation are finer at the minimum solubility of the silver halide, when the gelatin concentration is increased to a certain limit, when the temperature is above the gelling point of gelatin and preferably between 30°–40°C, or when crystallization nuclei such as silver iodide or silver sulphide are present.

Further it is possible to retard the crystal growth by means of chemical compounds selected from the group of, e.g., imidazoles, thiazoles, thiolactic acid, 1-phenyl-5-mercaptotetrazole, nucleic acids, thiosulphate, cystine, thioglycollic acid, and dithiopyrimidine. These grain growth-inhibiting or -retarding compounds may be added during the precipitation or added to the silver halide dispersion after it leaves the turbulent flow mixing device. It is most significant that when forming a silver halide emulsion in a turbulent flow mixing device in accordance with the invention under conditions selected to promote the formation of fine grains, the presence of the grain growth restrainer in the thin film space appears to have little or no effect on the size of the silver halide grains but that the grain growth restrainer has to be added to the emulsion once it is no longer subjected to thin film turbulent flow mixing conditions, so, immediately after leacing the mixing device. It suffices therefore to add a restrainer to the emulsion as it leaves the mixing device.

Other grain growth restrainers that can be used are the mercaptotetrazole compounds referred to in United Kingdom patent specification 561,875, the heterocyclic compounds or mercapto compounds described in U.S. Pat. Nos. 2,432,506 and 2,432,864, in French Pat. No. 1,557,289, Belgian patent specifications 710,602 and 723,492 and in the specifications of our co-pending patent application Ser. Nos. 53,025/69 and 54,539/69. For grain growth restraining purposes are further mentioned sulphonated heterocyclic mercapto compounds, e.g. 2-mercapto-5-sulphobenzothiazole, 2-mercapto-8-sulphonaphthoxazole and 2-mercapto-5-chloro-7-sulphobenzoxazole, selenium compounds, e.g. the diselenides described in Belgian Patent Specification No. 747,012 e.g. diphenyl diselenide and p,p'-dichlorodiphenyl diselenide. It is preferable to use grain growth restrainers containing aromatic nuclei.

When applied to silver halide emulsion preparation, the invention of course is not restricted to the preparation of fine grain emulsions. It is moreover possible and desirable for various purposes to ripen the emulsion, which discharge from the turbulent flow mixing passageway. This ripening can be performed without losing the advantage of a uniform emulsion with a narrow grain size distribution. In fact by physical ripening, the grain size distribution can be made even narrower. A large grain size distribution can be obtained by carrying out the precipitation on already existing grains, e.g., by recycling the initially obtained grains or by carrying out further precipitation in one or more interconnected mixing devices through which the initially prepared emulsion is fed.

Figure 17:
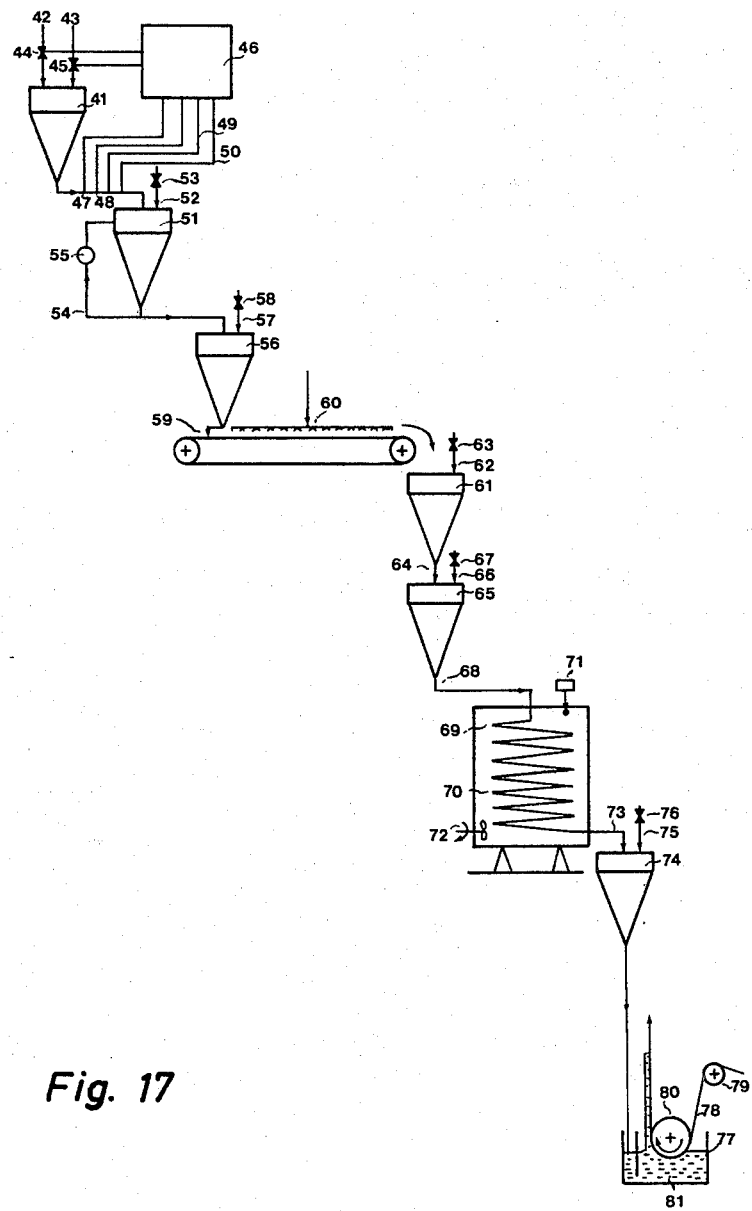
FIG. 17 is a block diagram illustrating the continuous manufacture of light-sensitive silver halide coating compositions.

The flow diagram constituting FIG. 17 represents the continuous production of light-sensitive silver halide emulsions wherein a series of thin film turbulent flow mixing devices according to FIG. 14 is used.

The production starts with the precipitation of silver halide grains (emulsification) in a heatable and thermostabilizable mixing device 41 at a given temperature $T_1$. The device is provided with two separate feed inlets 42 and 43, one for the aqueous solution of the silver nitrate and one for the desired halide and protective colloid, usually gelatin. The feed proceeds at a rate controlled by magnetic valves 44 and 45, which are controlled by means of signals provided by the control-regulating and recording unit 46, which has been described in more detail in relation to FIG. 16. This unit is connected to a resistance thermometer 47, a glass electrode 48, a calomel electrode 49 and a silver electrode 50. The emulsion obtained in deivce 41 is introduced into device 51 in which it is subjected to a ripening treatment at a temperature $T_2$, which is not necessarily the same as $T_1$; additional precipitation of silver halide on the nuclei already formed may take place, resulting in crystal growth. The inlet 52 with control valve 53 is used in introduced additional silver salts, halide and/or silver halide solvents or gelatin, e.g., phthaloyl gelatin.

The emulsion is optionally partly or wholly recycled through the conduit 54, which is provided with a regulating pump 55.

At the end of the physical ripening the gelatin is coagulated and co-precipitates with the silver halide in the mixing device 56. For that purpose and according to the method of coagulation or flocculation applied a precipitant is introduced through the inlet 57, which is provided with a control valve 58. Thus, there can be used an aqueous solution of ammonium sulphate, organic sulphonic acids, e.g., polystyrene sulphonic acid, or simply a pH-decreasing substance in the event that acylated gelatin is added to the emulsion in the preceding step(s). The acylated gelatin is used in the emulsification stage or added at the end of the ripening, which in the latter case is carried out above the isoelectric point of the gelatin. In the coagulation stage acid is introduced through inlet 57 in order to reduce the pH to about 4, whereupon the coagulation of the gelatin occurs. The coagulum, which preferably has the form of fine firm curds, is applied to an endless belt 59 having a sieve-like character. A fine spray of wash water is directed onto the curds, e.g., from a conduit 60 arranged along the whole length of the belt 59. According to a particular embodiment a second and third washing may take place in a cooled mixing device of the type described in the present invention but having a sieve-like perforated chamber wall through which the washing liquids are evacuated.

At the end of the washing stage the curds are fed into the hopper of a mixing device 61 and under intensive stirring at a proper temperature and pH the coagulum is redispersed therein. The pH-controlling compounds and the water, which are supplied at a proper temperature for the redispersion, are introduced through the inlet 62 provided with a control valve 63.

The redispersed silver halide crystals having obtained their final size distribution and having been freed from impurities and excess halide ions are now in a suitable condition for being mixed with chemical sensitizers in a mixing device 65 connected to mixing device 61 through outlet 64.

In essence the chemical sensitization consists in the addition to the emulsion of chemical compounds that increase its light-sensitivity. The sensitization is associated with a special temperature treatment, usually performed after the addition of the sensitizer(s). This treatment at elevated temperature, e.g. from 40° to 75°C, may last from a few minutes up to several hours, until the desired speed and maximally admitted fog are reached.

The chemical sensitizer(s) are added at a controlled rate through the conduit 66 provided with a valve 67. The outlet 68 of the mixing device 65 directly or via an intermediate storage drum is connected to a coil 69 positioned in a large thermostat 70 provided with the necessary temperature control unit 71 and stirring means 72. The rate of passage of the emulsion through the coil determines the digestion time.

Three types of chemical sensitization are available for use in the digestion process according to the purpose in view:

1. sulphur sensitization,
2. reduction sensitization, and
3. precious metal sensitization.

At the end of the chemical sensitization the necessary adjuvants for obtaining the photographic emulsion in its final form for coating are introduced through the conduit 75 fitted with valve 76 into the mixing device 74 and mixed therein with the silver halide emulsion introduced through conduit 73. The emulsion ready for coating is discharged into the coating tray 77 in which the emulsion level is carefully controlled. The drawing represents a so-called trough coating method, by way of example, for coating a paper or film support 78 that is guided by a guiding roller 79 and passes around a roller 80 so placed that the support 78 comes into contact with the surface of the emulsion 81, which is kept at a closely controlled temperature.

In order to facilitate the transport of the photographic emulsion to and from the several mixing devices the latter are preferably arranged in cascade or assembled in a tower analogously to a distillation tower, so that gravity helps in the feed of the emulsion from one device into another. By operating in light-tight vessels, only the washing and coating room have to be provided with the well known dark-room safe-lighting, so that a great detal of the processing can be carried out in normally lit operating rooms.

Apart from its use for the production of silver halide emulsions the method according to the present invention may be used in the production of all kinds of suspensions and emulsions by means of all types of physical or chemical reactions producing substances in particulate or droplet form in a liquid phase. For example the method can be used for the preparation in turbulent flow conditions of all kinds of rather poorly water-soluble salts or complexes, e.g. nickel dimethylglyoxime, $BaSO_4$, $PbCrO_4$, $ZnCrO_4$, CdS, ZnS and other phosphors, e.g. suitable for fluorescent screens, metal oxides and hydroxides, e.g. HgO, $Pb(OH)_2$, $Fe(OH)_3$, and $Cr(OH)_3$ and metal particles, e.g. gold, mercury and silver dispersions obtained by reduction. The method may also be used for salting out organic and inorganic compounds and for preparing polymer latices and all kinds of colloid dispersions starting from colloid or polymer solutions.

As further examples of uses of the method according to the invention, it may be employed for preparing emulsions with very small droplets by feeding an emulsion containing larger droplets into the mixing passageway in which the turbulence prevails so that the droplets become divided by the action of the shearing forces that are generated through the whole volume of the liquid in the passageway. The formation of emulsions by mixing the materials that are to form the continuous and disperse phases by a method according to the present invention, or the use of that method for reducing the droplet size of an emulsion previously prepared, is of special importance in the emulsification of colour couplers to be used in photographic materials, e.g., in the production of oil-in-aqueous gelatin solution emulsions wherein the disperse phase contains a dissolved colour coupler. The attainment of a narrow size distribution of the oil droplets is important for promoting uniform reaction of the coupler at all places in the photographic material and for producing images with low graininess. It has been found moreover that emulsions of oil-colour former in gelatin, prepared according to the invention, are not opalescent but form layers that are completely transparent in the dry state. In addition the layers are much more resistant than layers prepared from the customary emulsions to spoiling by folding. This is due to the very good elasticity of the layers. As another specific example of the use of the invention, it can be employed for preparing dispersions of barium sulphate in a protective colloid for forming coating layers on paper and other types of support.

The present invention is illustrated by the following examples.

EXAMPLE 1

The following three solutions were prepared separately:
  A. an aqueous ammoniacal silver nitrate solution containing per liter 0.857 mole of silver nitrate and 1.714 mole of $NH_4CH$,
  B. an aqueous halide solution containing 3 mole of potassium halide per liter (KBr/KCl/KI — 100/10/1 parts by weight),
  C. an aqueous acetic acid solution containing 3.5 mole of $CH_3COOH$ per liter,
  D. an aqueous 0.5 % by weight gelatin solution.

By means of these solutions the precipitation (emulsification) of light-sensitive silver halide was carried out in a mixing vessel with an inlet system according to FIG. 15 and having a housing and rotor as diagrammatically represented in FIG. 14.

The height $h_1$ (see FIG. 8) of the rotor part in the conical chamber was 122 mm. The height $h_2$ of the rotor part in the hopper was 65 mm. The diameter $\phi_1$ of the rotor was 54 mm and the diameter $\phi_2$ was 5 mm. The angles $\alpha$ and $\beta$ were both 10°. The clearance (c) was 1.5 mm.

The rotor was formed with a rectangular section halicoidal groove.

The width of the groove between the crests of the thread was 7 mm, the width of the crests 3 mm and the depth of the groove 1.5 mm. The rotor and light-tight housing were made of stainless steel. The angular speed of the rotor during the precipitation was 760 rpm.

The solutions (A), (B), (C) and (D) were simultaneously introduced in the following proportions through the separate inlets 14, 15, 16 and 19 as indicated in FIG. 15.
  solution (A) : 174 ml per min.
  solution (B) : 148 ml per min.
  solution (C) : 82 ml per min.
  solution (D) : 280 ml per min.

Working under these conditions the contact time of the reactants in the clearance (thin film) was about 2.5 sec.

The temperature was kept constant at 49°C during the precipitation. The pH and pAg expressed in mV measaured at the outlet were 8.15 and −35 mV respectively.

The apparatus was kept in operation under the above described working conditions for 16 min.

The mean diameter of the silver halide grains obtained was 114 nm. The mean diameter of the grain was determined by means of specific adsorption of a dye as described in Photographische Korrespondenz, Vol. 101, no. 3 (1965), p. 38–39 and by electron microscopic measurement.

Figure 18:
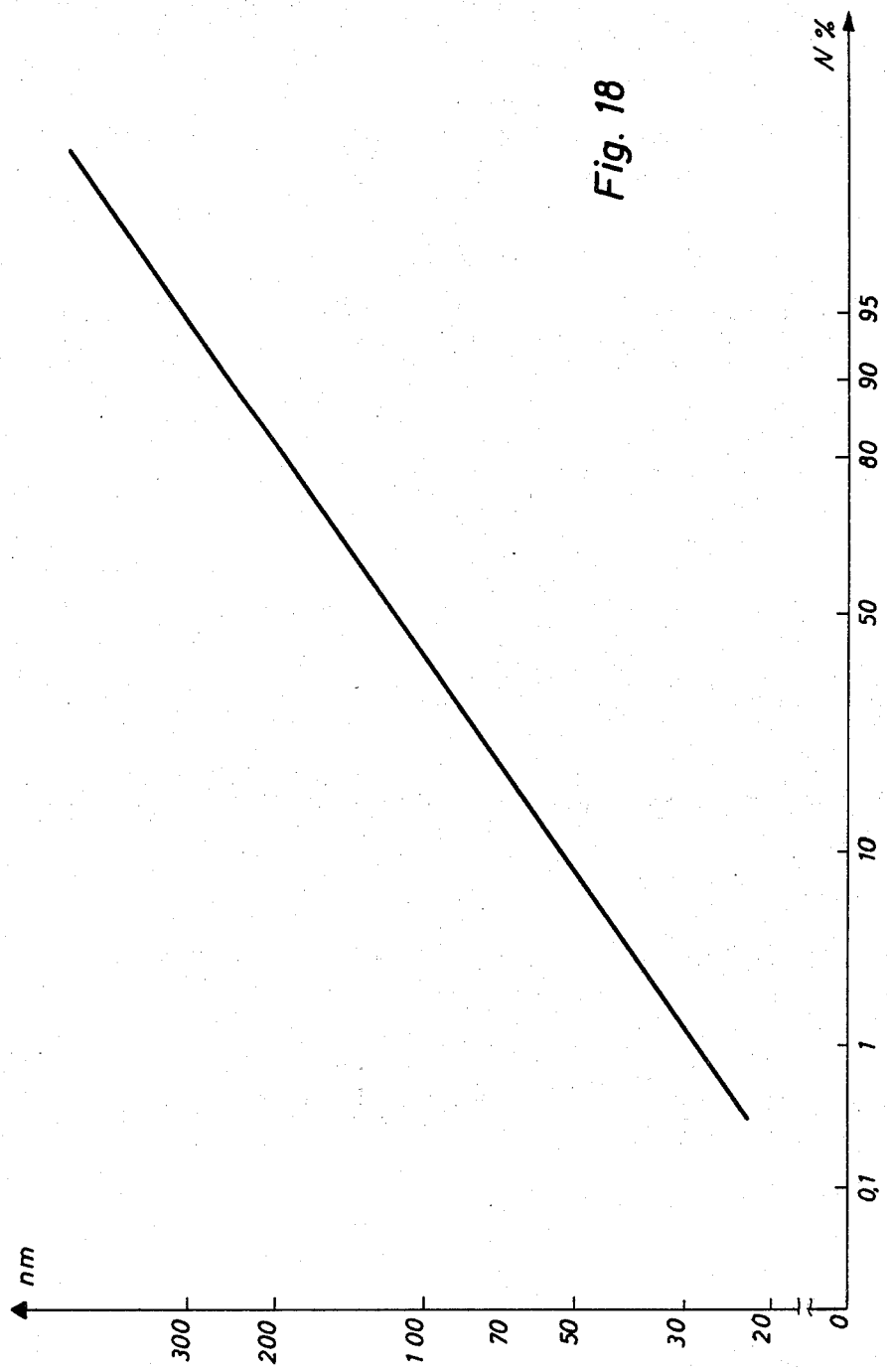
FIGS. 18 and 19 are grain size distribution curves appertaining to silver halide dispersions prepared according to the present invention.

From the grain size distribution curve forming figure 18 it is apparent that the distribution is very narrow. The ordinate of the diagram stands for increasing grain diameters expressed in nanometer (nm). The abscissa of the diagram stands for the number (N) expressed as a percentage of grains having a diameter smaller than the value corresponding therewith on the abscissa. The graph shows that 98 % of the grains have a grain size between 50 and 300 nm.

EXAMPLE 2

This example relates to the preparation of a photographic silver halide emulsion with large grain size distribution by plural stage treatment.

The following solutions were prepared for use in a first precipitation stage.
  A. a mixture of 1.5 part of volume of ammoniacal silver nitrate containing per liter 3 mole of silver nitrate and 6 mole of ammonium hydroxide and 3.5 parts by volume of demineralized water.
  B. a homogeneous mixture of:

| | |
|---|---:|
| a 3 molar aqueous solution of potassium bromide | 4000 ml |
| a 3 molar aqueous solution of sodium chloride | 300 ml |
| a 3 molar aqueous solution of potassium iodide | 100 ml |
| demineralized water | 2700 ml |
| inert gelatin | 300 g |
| sufficient aqueous ammonium hydroxide to reach a pH of 10.5 measured at 40°C. | |

FIRST PRECIPITATION STAGE

A mixing device 1 of the type described in Example 1 was used and the solutions (A) and (B) were introduced therein through separate inlets at a rate of 65 ml per min. and 300 ml per min. respectively.

During the precipitation the angular speed of the rotor was 500 rpm. The temperature measured at the outlet was 62°C.

The pH and pAg expressed in mV and measured at the outlet were 10.8 and −160mV respectively. The first precipitation operation lasted 3 min.

SECOND PRECIPITATION STAGE

In the same mixing device as used in the first precipitation stage the following liquids were introduced through separate inlets at the specified rates:
  liquid (A) as used in precipitation stage 1 at a rate of 65 ml per min.
  liquid (B) as used in precipitation stage 1 at a rate of 300 ml per min.
  the dispersion discharging from the mixing device in precipitation stage 1, at a rate of 500 ml per min.

The duration of the second precipitation operation was 2 min.

THIRD PRECIPITATION STAGE

The precipitation stage 1 was repeated with the difference, however, that now the output dispersion of precipitation stage 2 was used in combination with the solutions (A) and (B) of stage 1.

The introduction rates were:
  solution (A): 65 ml per min.
  solution (B): 300 ml per min.
  Output dispersion of precipitation stage 2: 500 ml per min.

The mean diameter of the silver halide grains obtained was measured by an electron microscope. It amounted to 300 nm.

Figure 19:
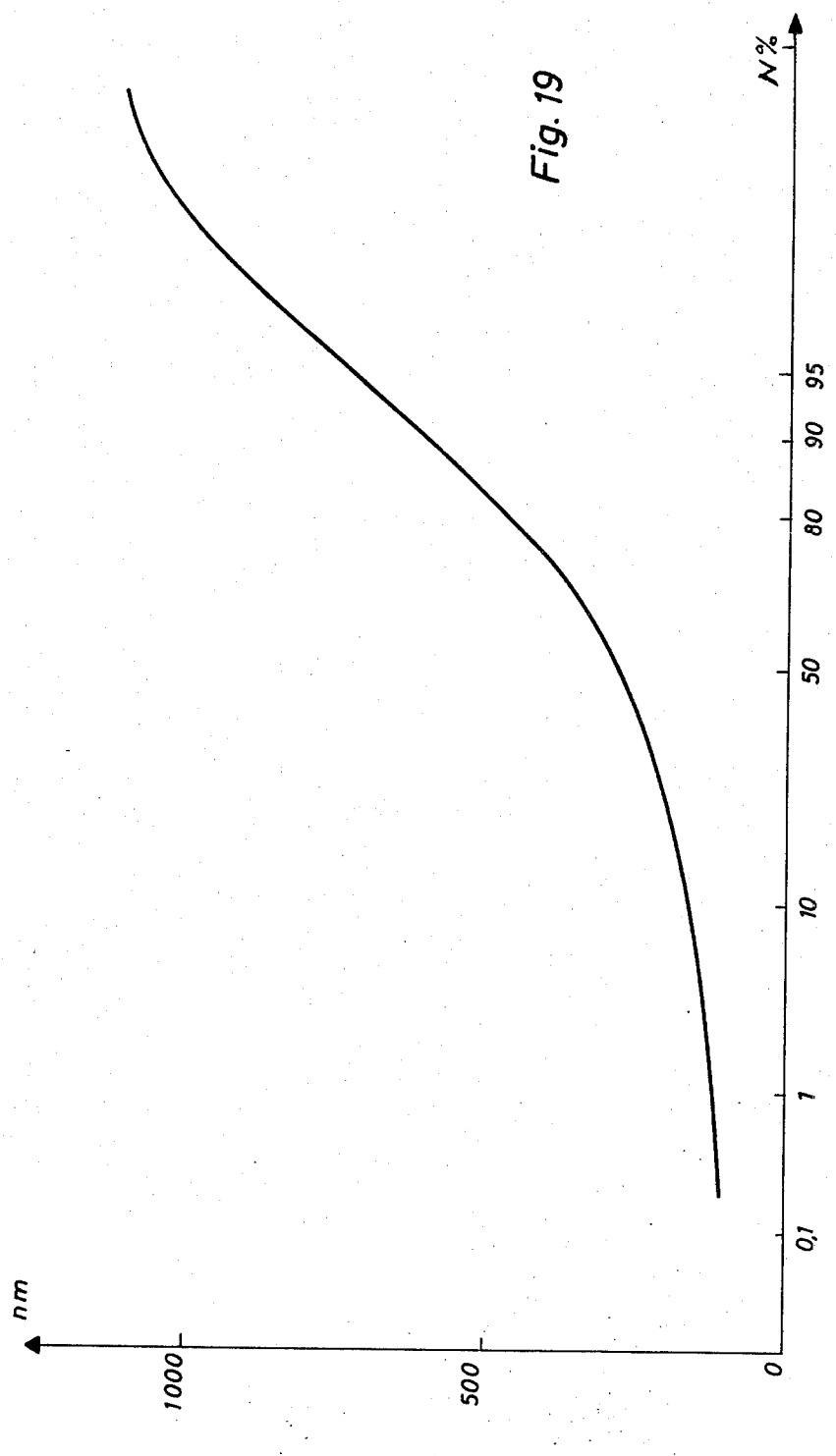

The results are represented in FIG. 19 from which it can be seen that 98 % of the grains have a grain size between 10 and 1000 nm. The ordinate of the graph stands for increasing grain diameters expressed in nanometer (nm). The abscissa of the diagram stands for the number N (expressed as a percentage) of grains having a diameter lower than that indicated by the corresponding "nm" value.

EXAMPLE 3

The following four solutions were prepared separately:
A. an aqueous solution containing 0.3 mole of silver nitrate per liter,
B. an aqueous halide solution containing 0.3 mole of potassium bromide per liter,
C. an aqueous acetic acid solution containing 3.5 mole of acetic acid per liter,
D. an aqueous 1 % by weight gelatin solution.

By means of these solutions the precipitation (emulsification) of light-sensitive silver bromide was carried out in a mixing vessel with an inlet system according to FIG. 15 and having a housing and rotor as schematically represented in FIG. 14.

The height $h_1$ (see FIG. 8) of the rotor part in the conical chamber was 122 mm. The height $h_2$ of the rotor part in the hopper was 65 mm. The diameter $\phi_1$ of the rotor was 54 mm and the diameter $\phi_2$ was 5 mm. The angles $\alpha$ and $\beta$ were both 10°. The clearance (c) was 1.5 mm.

The rotor was formed with a rectangular section helicoidal groove.

The width of the groove between the crests of the thread was 7 mm, the width of the crests 3 mm and the depth of the groove 1.5 mm.

The rotor and light-tight housing were made of stainless steel.

The angular speed of the rotor during the precipitation was 900 rpm.

The solution (A), (B), (C) and (D) were simultaneously introduced in the following proportions through the separate inlets 14, 15, 16 and 19 as indicated in FIG. 15.

Solution (A) : 193 ml per min.
Solution (B) : 164 ml per min.
Solution (C) : 58 ml per min.
Solution (D) : 700 ml per min.

By working under these conditions, the concentration of the silver ions, which was measured potentiometrically at the outlet of the mixing device was such that is corresponds with a millivolt reading between +300 and +400 mV. The pH of the emulsion leacing the apparatus was between 3 and 4. The contact time of the reactants in the clearance (thin film) was about 2.5 sec.

The temperature was kept constant at 35°C during precipitation.

The dispersion leaving the outlet was mixed with an aqueous potassium bromide solution at such a rate that a voltage of +50 mV was measured potentiometrically in the mixed composition.

The mean diameter of the silver halide grains obtained at the outlet was 100 nm. The mean diameter of the grains was determined turbidimetrically as described in Sci. Ind. Phot. (2) Vol. 19, November 1948, 401–418 and by measurement with an electron microscope.

When per mole of silver nitrate 300 mg of 1-phenyl-2-tetrazoline-5-thione having the following tautomeric structure:

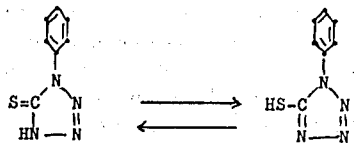

were used in solution (B) as grain growth restrainer and when there was operated under the conditions described above silver bromide grains having a mean diameter of 20 nm were obtained.

EXAMPLE 4

The following four solutions were prepared separately:
A. an aqueous solution containing 0.3 mole of silver nitrate per liter,
B. an aqueous halide solution containing 0.3 mole of potassium bromide per liter,
C. a 20 % aqueous acetic acid solution,
D. an aqueous 1 % by weight gelatin solution.

By means of these solutions the precipitation (emulsification) of light-sensitive silver bromide was carried out in a turbulent flow mixing vessel with an inlet system according to FIG. 15 and having a housing and rotor according to FIG. 14.

The height $h_1$ (FIG. 8) of the rotor part in the conical chamber was 122 mm. The height of the rotor part in the hopper was 65 mm. The diameter $\phi_1$ of the rotor was 54 mm and the diameter $\phi_2$ was 5 mm. The clearance (C) was 1.5 mm. The pitch of the thread on the rotor was 6 mm. The depth of the groove was 2 mm. The width of the groove between the crests of the thread was 6.5 mm.

The rotor and the light-tight housing were made of stainless steel.

The angular speed of the rotor during precipitation was 850 rpm.

The solutions (A), (B), (C) and (D) were simultaneously introduced through the separate inlets 14, 15, 16 and 19 as indicated in FIG. 15.

Solution (C) was introduced at such a rate that at the outlet of the apparatus a pH of 3.5 was obtained in all the tests described hereinafter.

Solution (D) was introduced at a rate of 600 ml per min. in all the tests described hereinafter.

The following Table 1 gives data appertaining to sixteen different tests and shows the evolution of the silver halide grain size as a function of the pAg measured at the outlet of the turbulent flow mixing vessel. The pAg values and density (D) values corresponding with the turbidity of the dispersions were measured at 750 nm 1.5 min. after the emulsion left the mixing apparatus, the measurement being made in spectrophotometer cells of a spectrophotometer known as the "Spectronic 505" (trade mark of Bausch and Lomb inc., Rochester, N.Y., U.S.A.).

The turbidity-density is directly proportional to the grain size of the precipitated silver halide.

The silver nitrate solution (solution A) and the potassium bromide solution (solution B) were introduced at an equimolar ratio and a rate of 152 ml per min. The temperature maintained during precipitation was 35°C.

Table 1

| Test No. | pAg | Density (D) |
|---|---|---|
| 1 | 2.75 | 0.31 |
| 2 | 3.15 | 0.30 |
| 3 | 3.65 | 0.34 |

Table 1-continued

| Test No. | pAg | Density (D) |
| --- | --- | --- |
| 4 | 4.00 | 0.39 |
| 5 | 4.35 | 0.51 |
| 6 | 4.70 | 0.47 |
| 7 | 4.85 | 0.84 |
| 8 | 5.60 | 0.46 |
| 9 | 5.85 | 0.43 |
| 10 | 10.00 | 0.50 |
| 11 | 9.20 | 0.33 |
| 12 | 8.50 | 0.31 |
| 13 | 7.80 | 0.40 |
| 14 | 7.40 | 0.44 |
| 15 | 6.50 | 0.52 |
| 16 | 6.30 | 0.52 |

Figure 22:
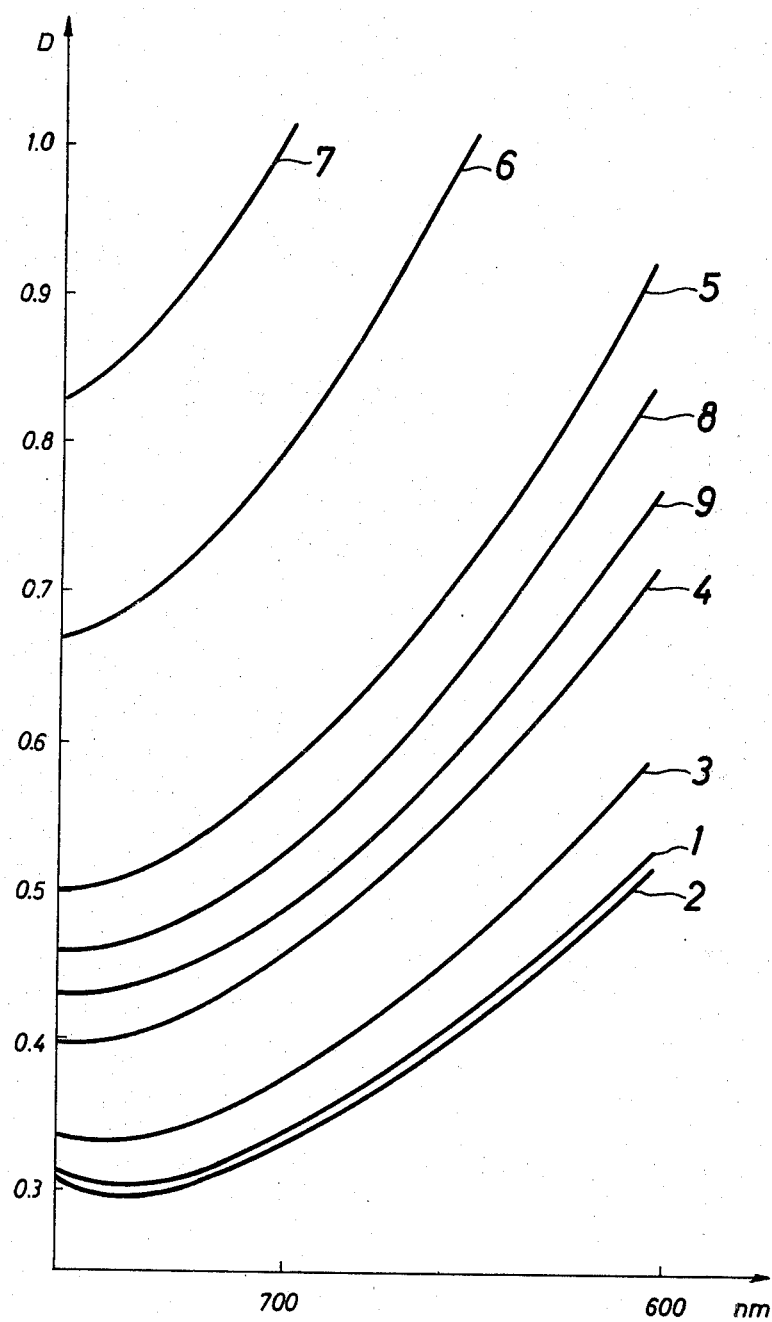
Figure 23:
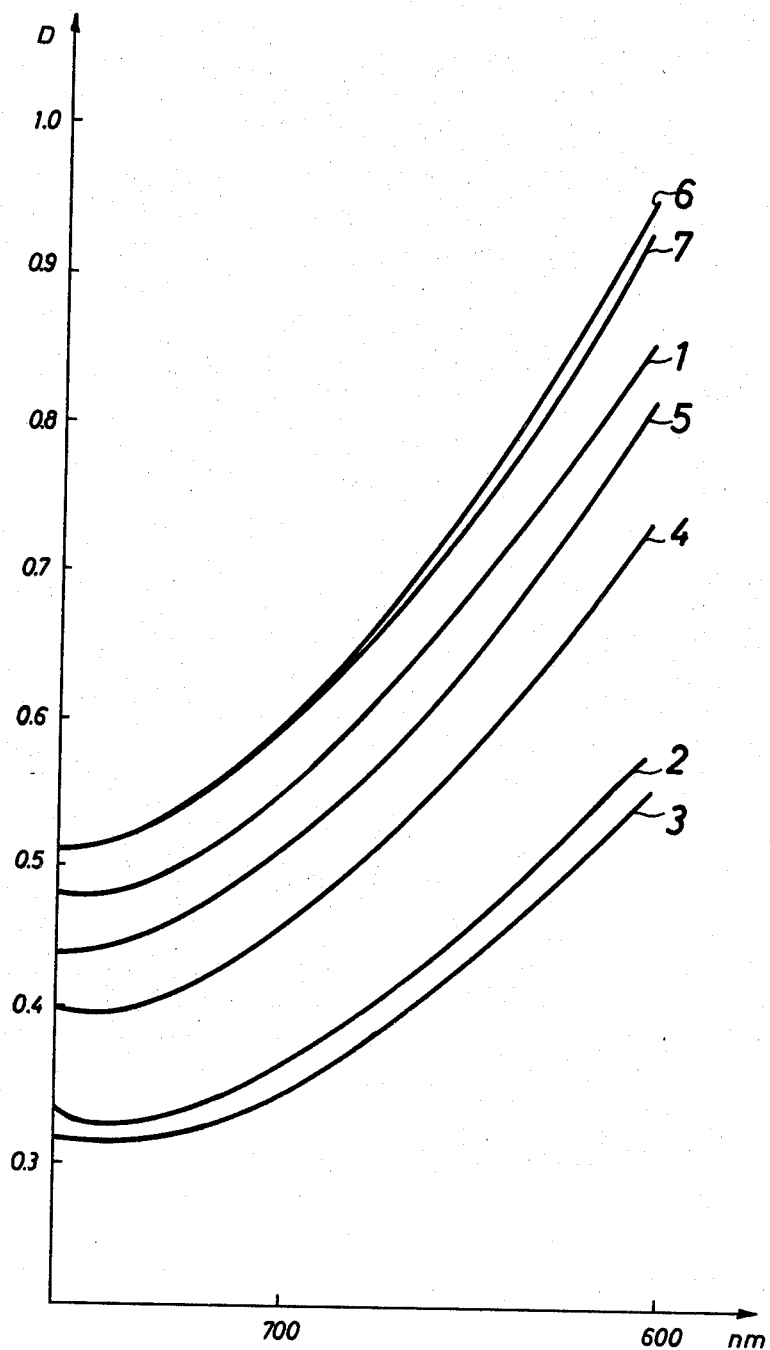

FIGS. 22 and 23 are graphs obtained by plotting the "turbidity-density" (D) versus wavelength (from 760 to 600 nm) in respect of the tests 1–16. The curves 1–9 of FIG. 22 correspond with tests 1–9 of the preceding table, and the curves 1–7 of FIG. 22 with the tests 10–16 of said table.

It can be seen from these curves that in the range of low pAg values, i.e., from 2.75 to 6, the turbidity, in other words the mean grain size is minimal at the pAg value at which the silver halide solubility is also minimal (pAg = 3.00).

In the range of higher pAg values 10 to 6 the turbidity is minimal at pAg = 8.5 due to excess of halide ions in respect of silver ions.

EXAMPLE 5

The same procedure as explained in Example 4 was followed for a pAg of 7.9 (= 85 millivolt) at precipitating temperatures of 35° and 42°C respectively.

Figure 24:
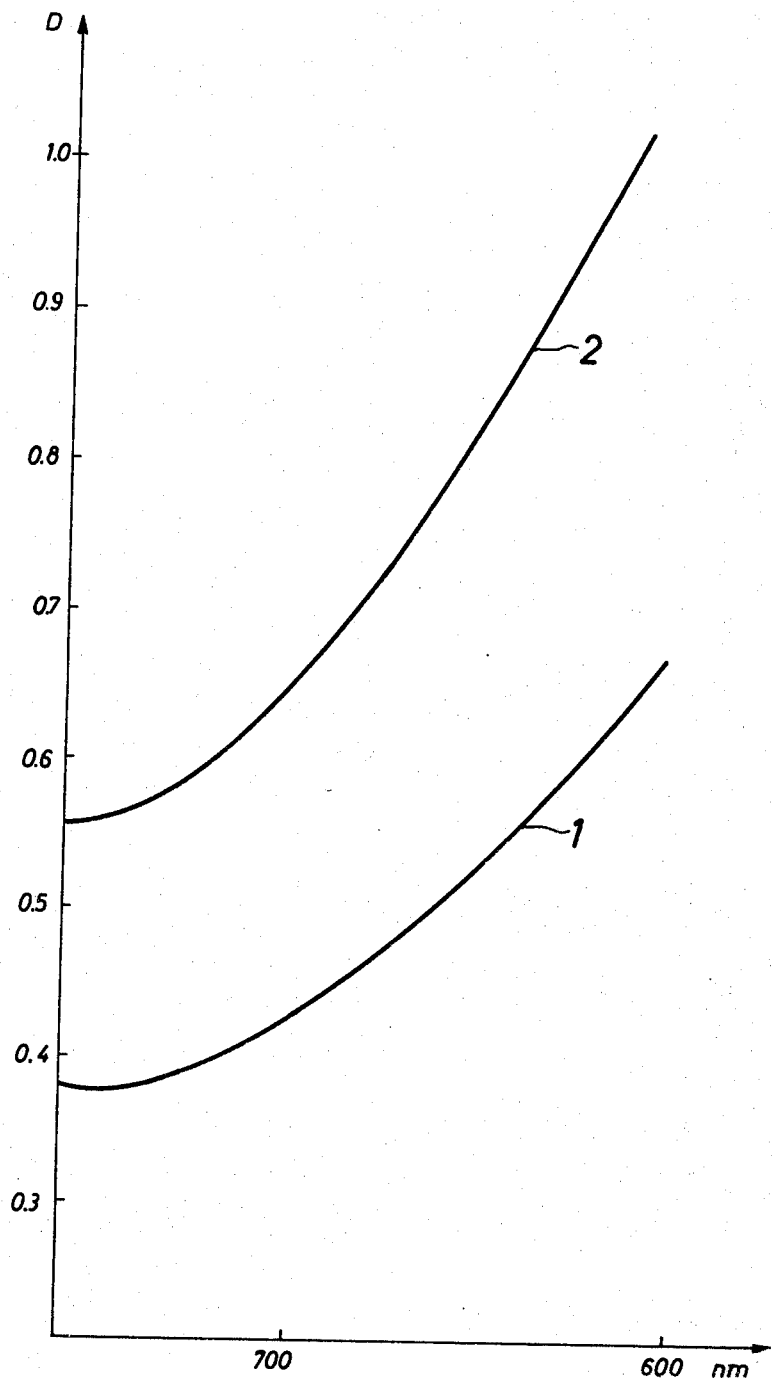

In FIG. 24 curves 1 and 2 represent the relationship of "turbidity-density" (D) to wavelength (nm) in respect of silver bromide dispersions formed at 35° and 42°C respectively. From these curves it can be seen that grain size of the silver bromide increases directly proportionally to the temperature of precipitation.

EXAMPLE 6

The following four solutions were prepared separately:
A. an aqueous solution containing 0.3 mole of silver nitrate per liter,
B. an aqueous halide solution containing 0.3 mole of potassium bromide per liter, and 2 % by weight of gelatin,
C. a 20 % aqueous acetic acid solution,
D. an aqueous 1 % by weight gelatin solution.

By means of these solutions the precipitation (emulsification) of light-sensitive silver bromide was carried out in a turbulent flow mixing vessel as described in example 22.

During precipitation the angular speed of the rotor was 850 rpm.

Figure 25:
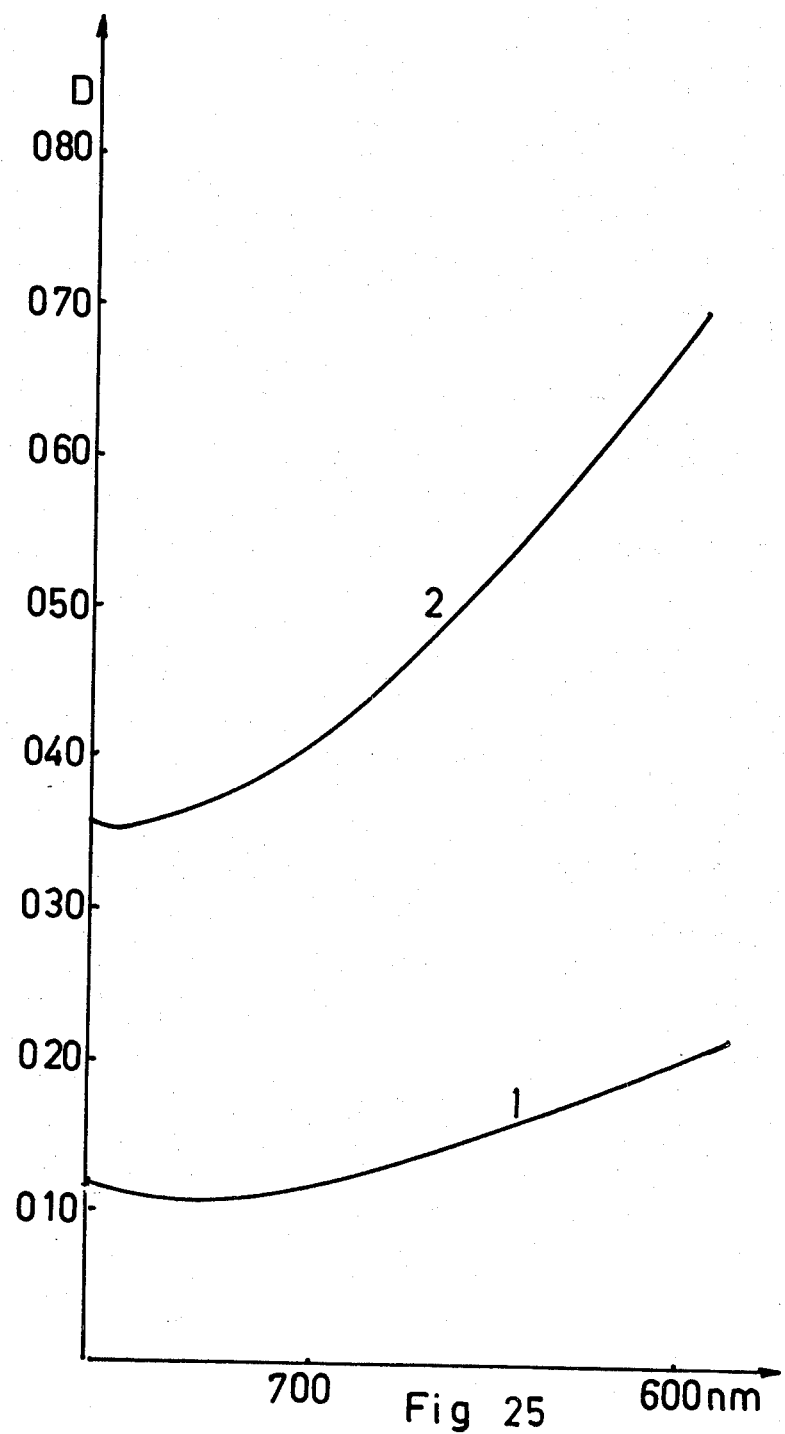

The curves 1 and 2 in FIG. 25 give an indication of the effect of the silver ion and halide ion concentration on the silver halide grain size.

At the start of the precipitation these concentrations may be easily controlled regulating the supply of solution (D), which acts as diluent.

The operating conditions for two tests were chosen in such a way that in a first test the silver nitrate and potassium bromide came into contact inside the mixing vessel in concentrations of 0.05 mole/liter whereas in a second test the concentrations on such contact were 0.075 mole/liter. This was realized by introducing the silver nitrate solution (A) and potassium bromide solution (B) in equimolar amounts at a rate of 152 ml per min. and introducing liquid (D) at a rate of 600 and 300 ml per. min. for tests 1 and 2 respectively. During this operation the pH was kept at 3.5 by means of solution (C).

The temperature during the precipitation was maintained at 35°C.

Samples of the emulsion discharged from the mixing device were taken 1.5 min. after the precipitation and the turbidity thereof was measured as described in Example 4.

Curve 1 of FIG. 25 represents the turbidity-density (D) versus wavelength (nm) variation of the sample obtained in test 1, wherein per liter 0.05 mole of silver nitrate and 0.05 mole of potassium bromide were used in the precipitation stage.

Curve 2 of FIG. 25 represents the turbidity-density (D) versus wavelength (nm) variation of the sample obtained in test 2, wherein per liter 0.075 mole of silver nitrate and 0.075 mole of potassium bromide were used in the precipitation stage.

From the curves in FIG. 25 it can be deduced that with a rise in the concentration of the starting materials (silver ions and halide ions) the grain size of the silver halide increases and that by using a low concentration solution (i.e. a solution containing per liter about 0.05 mole of each of the reagents) very fine grains can be obtained under the conditions described.

The mean grain size of the silver halide grains obtained in tests 1 and 2 was 11 nm and 26 nm respectively.

EXAMPLE 7

The following four solutions were prepared separately:
A. an aqueous solution containing 0.3 mole of silver nitrate per liter,
B. an aqueous solution containing 0.3 mole of potassium bromide per liter and 2 % by weight of gelatin,
C. a 20 % aqueous acetic acid solution,
D. an aqueous 1 % by weight gelatin solution,
E. as pH-correcting solution, an aqueous 1 N sodium hydroxide solution
F. as pAg-correcting solution, an aqueous solution of 0.03 mole of silver nitrate per liter.

By means of these solutions the precipitation of light-sensitive silver bromide was carried out in a turbulent flow mixing vessel as described in Example 4.

During precipitation the angular speed of the rotor was 850 rpm.

Figure 26:
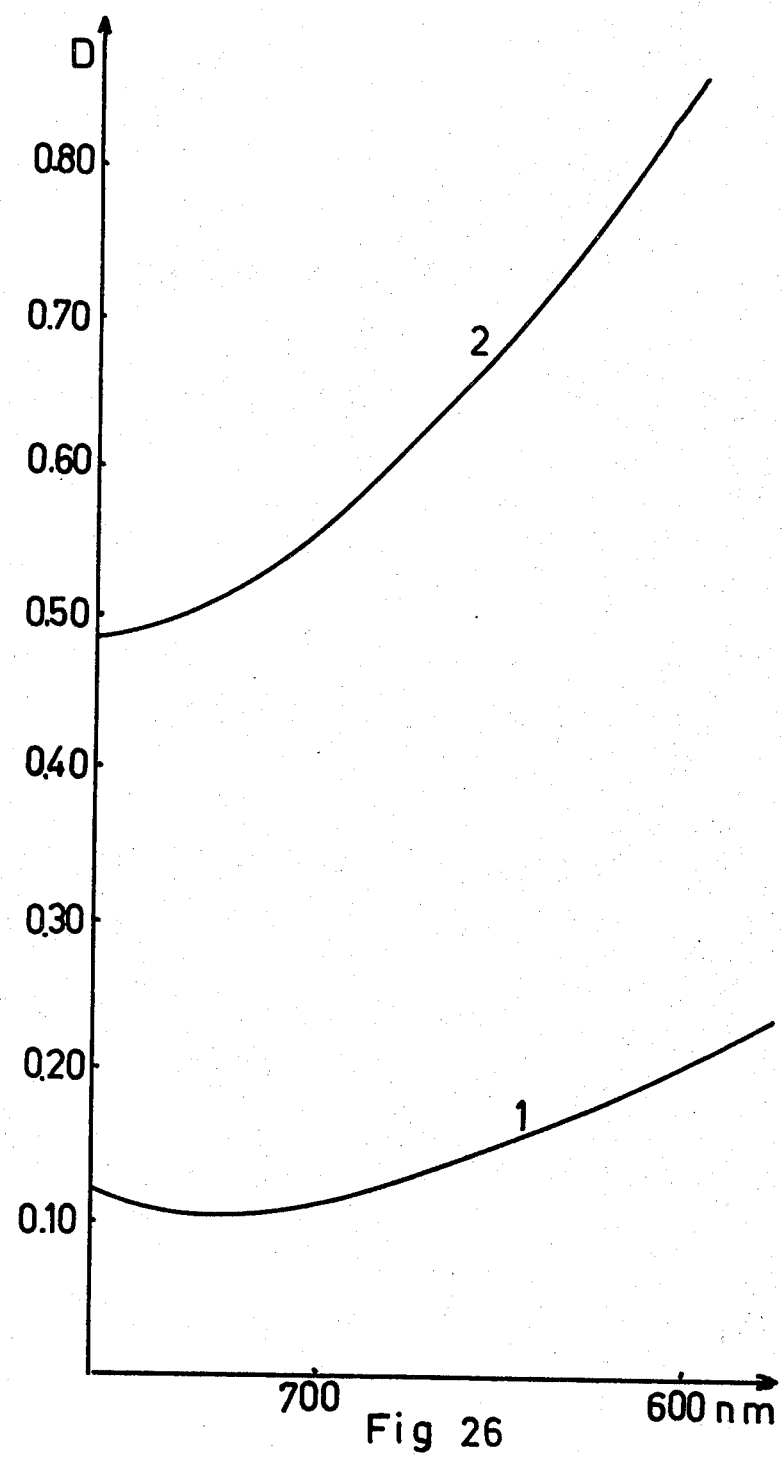

The curves 1 and 2 in FIG. 26 give an indication of the effect of the pH, at a constant pAg value of 2.75 on the silver halide grain size.

In a first test (represented by curve 1) the precipitation was carried out a pH value of 3.5 whereas in a second test (represented by curve 2) the precipitation was carried out at a pH of 5.0.

Samples of emulsion discharged from the mixing vessel were taken 1.5 min. after the precipitation, and the turbidity thereof was measured as described in Example 4.

Curve 1 of FIG. 26 represents the turbidity-density (D) versus wavelength (nm) variation of the product of the first test, which was obtained by operating at a pH of 3.5.

Curve 2 of FIG. 26 represents the turbidity-density (D) versus wavelength (nm) variation of the product of the second test, which was obtained by operating at a pH of 5.0.

From the curves in FIG. 26 it can be deduced that with a rise of the pH the grain size of the silver halide increases.

The average grain size of the silver halide grains obtained was 11 nm for the first test and 36 nm for the second test.

EXAMPLE 8

The following four solutions were prepared separately:

A. an aqueous solution containing 0.3 mole of silver nitrate per liter,
B. an aqueous halide solution containing 0.3 mole of potassium bromide per liter and 2 % by weight of gelatin,
C. a 20 % aqueous acetic acid solution,
D. an aqueous 1 % by weight gelatin solution.

By means of these solutions the precipitation (emulsification) of light-sensitive silver bromide was carried out in a turbulent flow mixing vessel with an inlet system according to FIG. 15 and having a housing and rotor as shown in FIG. 8.

The height $h_1$ (see FIG. 8) of the rotor part in the conical chamber was 122 mm. The height of the rotor part in the hopper was 65 mm. The diameter $\phi_1$ of the rotor was 54 mm and the diameter $\phi_2$ was 5 mm. The clearance (C) was 1.5 mm.

The rotor of the light-tight housing were made of stainless steel.

The angular speed of the rotor during the precipitation was 800 rpm.

The solutions (A), (B), (C) and (D) were simultaneously introduced through the separate inlets 34, 35, 36 and 49 as indicated in FIG. 15.

Solution (C) was introduced at such a rate that at the outlet of the apparatus a pH of 3.5 was obtained in all the tests described hereinafter.

Solution (D) was introduced at a rate of 600 ml per min. in all the tests described hereinafter. The millivolt reading at the outlet was 420 mV. Immediately after the silver bromide emulsion left the apparatus sufficient aqueous potassium bromide solution was added to bring the millivolt value at 50.

In test 1, which is the reference test, no grain growth restrainer was used during precipitation.

In test 2, 1 ml of 20 % aqueous solution of poly-N-vinylpyrrolidone were added as grain growth restrainer per 100 ml of emulsion leaving the apparatus.

In FIG. 27 curves 1, 3 and 4 represent the turbidity-density (D) variations versus wavelength (nm) of a sample of the product of test 1 taken off 1.5 min, 10 min and 20 min. respectively after it left the mixing vessel. Curve 2 represents the turbidity-density (D) variations wavelength (nm) of a sample of the product of test 2 taken 1.5 min. after having left the mixing vessel. The turbidity was measured by means of a spectrophotometer known as the "Spectronic 505" as referred to in Example 4.

EXAMPLE 9

The following four solutions were prepared separately:

A. an aqueous solution containing 0.3 mole of silver nitrate per liter,
B. an aqueous solution containing 0.3 mole of potassium bromide per liter and 2 % by weight of gelatin,
C. an aqueous acetic acid solution,
D. an aqueous 1 % by weight gelatin solution.

By means of these solutions the precipitation (emulsification) of light-sensitive silver bromide was carried out in a turbulent flow mixing vessel as described in Example 4.

During the precipitation the angular speed of the rotor was 900 rpm.

The solution (A), (B), (C) and (D) were simultaneously introduced through the separate inlets 34, 35, 36 and 49 as indicated in FIG. 15.

Solution A was introduced at a rate of 190 ml per min.

Solution B was introduced at a rate of 160 ml per min.

Solution C was introduced at a rate of 70 ml per min.

Solution D was introduced at a rate of 700 ml per min.

A series of tests was carried out wherein immediately after the silver bromide emulsion left the mixing vessel, 0.5 millimole of a grain growth restrainer was added. The dispersion was adjusted by means of aqueous potassium bromide solution to a millivolt reading of + 50 mV (Ag/saturated calomel electrode).

Samples of the emulsion of the different tests were then treated under the same conditions with an aqueous 20 % by weight ammonium sulphate solution and the precipitated silver halide grains surrounded with gelatin washed with 5 liter of demineralized water containing 0.25 millimole of the particular grain growth restrainer used above.

The whole operation of precipitating and washing the emulsion grains lasted 1 hour 30 min. Before taking samples and making photographs of the silver bromide grains in an electronic microscope (enlargement 50,000 x), each sample was kept for 2 hours at 40°C.

In the following table II are listed the grain growth restrainer used and the average silver bromide grain size obtained in the different tests.

Table II

| Test No. | Grain growth restrainer | Average grain size |
|---|---|---|
| 1 |  | 60 nm |
| 2 | [structure: 1-methyl-thiosemicarbazide type triazole with S=C, HN—N, CH₃] | 40 nm |
| 3 | [structure: H₂N-phenyl-C(=O)-NH with C=S] | 30 nm |
| 4 | [structure: phenyl-N triazole with S=C, HN—N] | 22 nm |
| 5 | [structure: HO₃S-phenyl-NH-C(=N)-S-CH₂-pyridine] | 18 nm |

In FIG. 28 curve 1 represents the turbidity-density (D) versus wavelength (nm) variation of a sample prepared under the running conditions of test 1 and taken 1.5 min. after leaving the outlet of the mixing vessel. Curve 2 represents the turbidity-density (D) versus wavelength (nm) variation of a sample prepared and taken under the running conditions of test 4, 1.5 min. after leaving the outlet of the mixing vessel.

EXAMPLE 10

The following liquids (A) and (B) were prepared for separate introduction into a mixing device as diagrammatically illustrated in FIG. 8.

A. a 10 % by weight aqueous gelatin solution,
B. dibutyl phthalate.

The height ($h_1$) of the rotor part in the conical chamber was 122 mm. The height ($h_2$) of the rotor part in the hopper was 65 mm. The diameter $\phi_1$ of the rotor was 54 mm and the diameter $\phi_2$ was 5 mm. The angles $\alpha$ and $\beta$ were both 10°. The clearance (c) during the operation was 0.87 mm. The rotor was made of stainless steel and had a smooth surface. The rotor speed was 1000 rpm.

Liquids (A) and (B) were introduced into the clearance at the top through the separate inlets. Liquid (A) was introduced at a rate of 700 ml in 3 min. 55 sec., whereas liquid (B) was introduced at a rate of 8.4 ml in the same time.

The temperature of the liquids in the mixing zone was 40°C. The liquid obtained at the outlet was re-fed once into the mixing device through one of the inlets.

The obtained emulsion was coated on a subbed cellulose triacetate support in a ratio of 12.5 g of gelatin per sq.m.

Tests carried out on brittleness showed that the emulsion layer had a much better resistance to spoiling by folding than layers that did not contain the dibutyl phthalate droplets.

The gelatin layer containing the oil droplets was completely transparent in dry state. Similarly good results were obtained with dimethyl phthalate. A higher content of dibutyl phthalate or dimethyl phthalate by introducing said liquids at rates of 11.2 ml and 14 ml per 3 min. 55 sec. resulted in gelatin coatings with still better elasticity.

This example gives an indication of how an oil former emulsion in a colloid binder can be prepared according to the invention. It is merely necessary to dissolve the selected colour former in the oil used for forming the disperse phase of the emulsion.

EXAMPLE 11

Barium sulphate was prepared by employing an apparatus like that used in Example 3 but having a rotor without a helical peripheral groove.

Two liquids (P) and (Q) were separately introduced into the clearance between the rotor and the housing.
(P) an aqueous 1 molar sulphuric acid solution
(Q) an aqueous 1 molar barium chloride solution.

The feed rate of liquids (P) and (Q) was 100 ml in 24 sec. and 100 ml in 25 sec. respectively. The liquids were fed into the clearance tangentially to the rotor surface and in the direction of the rotor rotation. The clearance was 1.7 mm, the temperature 20°C and the rotor speed 813 rpm.

In order to compare the difference in grain size between barium sulphate prepared from the same solution in a batch process (i.e. in a vessel provided with helical stirrer) and the barium sulphate prepared in this example, their sedimentation rates were compared.

A bath process sample inspected in a sedimentation tube had a sedimentation time of 15 min. A sample prepared in the continuous process according to this example had a sedimentation time of 95 min. for the same degree of sedimentation (1 cm of clear liquid at the top of the column).

EXAMPLE 12

A dispersion of ethylcellulose in an ethanol-water mixture was prepared by means of the same mixing device as that used in Example 10.

Two starting liquids, viz. water and a 5 % by weight solution in ethanol of Ethyl cellulose N7 (trade name of The Hercules Powder Company Inc., Wilmington, Del., U.S.A. for an ethylcellulose that is insoluble in a mixture of water and ethanol (1:1 by volume), were separately introduced into the clearance between the rotor and the housing.

The rotor speed was 930 rpm, the clearance 0.44 mm, and the temperature of the liquids 20°C.

The water was introduced at a rate of 104 ml per min. and the ethylcellulose solution at 14 ml per min.

A batch process operating with high speed stirrer (mixing turbine impeller) wherein the same liquids in the same volume ratio were used, yielded a much coarser dispersion than that obtained by means of the continuous turbulent flow mixing device according to this example.

EXAMPLE 13

The following four solutions were prepared separately:

A. an aqueous solution containing 0.3 mole of silver nitrate per liter diluted with 5 times its volume by distilled water,
B. 500 ml of an aqueous solution containing 0.3 mole of potassium bromide, 16 g of gelatin, 2484 ml of distilled water, 1000 ml of ethanol and 10 g of a grain growth restrainer having the following formula:

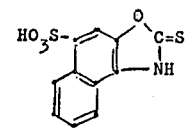

C. a diluted aqueous acetic acid solution,
D. an aqueous solution containing 3200 ml of water, 800 g of gelatin and 5 g of the above-mentioned grain growth restrainer.

By starting from these solutions the precipitation (emulsification) of light-sensitive silver bromide was carried out in a turbulent flow mixing apparatus as diagrammatically represented in FIG. 1 but wherein the solutions A and D were introduced at the centre of the conical rotor part in the hopper and the solutions B and C were introduced by spraying them against the inner wall of the hopper.

The characteristic measures of the mixing apparatus were the following:

$h_1 = 91$ mm $h_2 = 45$ mm
$\phi_1 = 42$ mm
$\phi_2 = 6$ mm

The clearance (C) was 1.2 mm and the angular speed of the rotor during the introduction of these aqueous solutions was 1150 rpm.

The solutions (A), (B), (C) and (D) were introduced at a rate of 200, 205, 150 and 190 ml per min. respectively.

The pH was kept thereby at 3.2 and the millivolt reading at the outlet being a measure for the pAg was + 440 mV when operating at a precipitating temperature of 38°C.

After precipitation the millivolt reading was adjusted at 70 mV by mixing the precipitate composition with aqueous potassium bromide.

Samples taken from the thus treated precipitate contained a major part of the silver halide grains having a size of 5 nm.

EXAMPLE 14

The following two solutions were prepared separately:
A. a solution of 150 g of polymethylmethacrylate dissolved in 750 ml of ethyl acetate,
B. a solution of 300 g of gelatin dissolved in 2100 ml of water containing 24 ml of a 20 % by weight aqueous solution of the dispersing agent MERSOLAT (trade name for a sulphonated paraffine of Bayer A.G., Leverkusen, W.-Germany).

Said solutions A and B were introduced simultaneously in the annular passage of a mixing vessel having a housing and rotor as diagrammatically represented in FIG. 4.

The height $h_1$ (see FIG. 1) of the rotor part in the conical chamber was 122 mm. The height $h_2$ of the rotor part in the hopper was 65 mm. The diameter $\phi_1$ of the rotor was 54 mm and the diameter $\phi_2$ was 5 mm. The angles $\alpha$ and $\beta$ were both 10°. The clearance (C) was 1.7 mm.

The rotor had a smooth surface and the rotor and light-tight housing were made of stainless steel.

The angular speed of the rotor during the mixing was 1030 rpm.

The solutions (A) and (B) were introduced in the following proportions:
Solution (A) : 70 ml per min.
Solution (B) : 92 ml per min.

Working under these conditions the contact time of the reactants in the clearance (thin film) was about 2.0 sec.

The temperature was kept constant at 44°C during the dispersing.

The mean diameter of the dispersed polymethyl methacrylate particles was 5000 nm. The mean diameter of the particles was determined by microscopic measurement.

The particle size distribution of the globules obtained by this procedure was much more homogeneous than could be obtained in a batch process dispersing technique. Moreover, the present continuous flow thin film mixing process allows the use of much more concentrated polymer solutions and the use of less dispersing agent and gelatin as protective colloid.

EXAMPLE 15

Example 13 was repeated but using a same amount of grain growth restrainer according to one of the following structural formula:

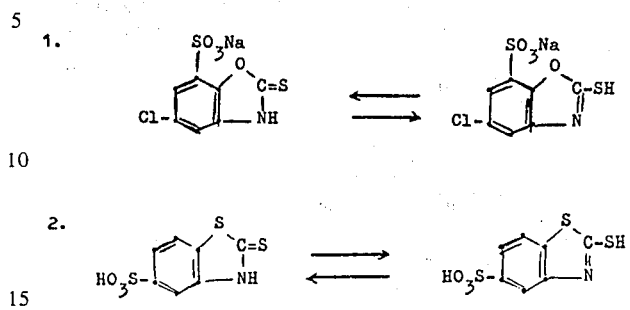

Silver halide grains produced in the presence of such a grain growth restrained had an average grain size of 5 nm.

We claim:
1. A method of preparing an aqueous dispersion of a water-immiscible solvent-soluble organic polymer by mixing together (a) a solution of said polymer in a water-immiscible organic solvent and (b) an aqueous liquid, said method comprising the steps of simultaneously and continuously introducing said solution and said liquid at a substantially controlled rate into one end of an annular passageway defined by generally closely spaced surfaces of revolution, continuously removing the resultant admixture of liquids from the other end of said passageway at a rate to produce a continuous flow of said admixture through said passageway from said one end to said other end while maintaining the passageway filled with said admixture, said passageway being elongated in the general direction of said flow therethrough and gradually tapering from said one end to the other, and producing relative rotational movement between said surfaces whereby at least one of said surfaces moves substantially obliquely to the general direction of flow through said passageway, the velocity of such rotational movement being sufficient to induce a turbulent flow condition in substantially the entirety of said admixture within said passageway.

2. A method of mixing according to claim 1 wherein the passageway has a transverse cross-sectional dimension of less than 5 mm.

3. A method of mixing according to claim 1 wherein the passageway is a annular layer space defined by the surfaces, which are continuously relatively rotated about an axis for generating such turbulent flow.

4. A method of mixing according to claim 1 wherein said passageway is in the form of an annular layer space defined by mutually facing coaxial surfaces of revolution extending at an angle other than perpendicular to the axis of rotation.

5. A method according to claim 1 wherein said aqueous liquid contains gelatin.

6. A method according to claim 1 wherein the organic polymer is polymethylmethacrylate.

7. A method according to claim 6 wherein the polymethylmethacrylate is dissolved in ethyl acetate.

8. The method of claim 1 wherein said surfaces of revolution have mutually corresponding axial regions which are generally peripherally smooth.

* * * * *